US012100539B2

(12) United States Patent
Bennett et al.

(10) Patent No.: US 12,100,539 B2
(45) Date of Patent: Sep. 24, 2024

(54) PATTERN WRITING OF MAGNETIC ORDER USING ION IRRADIATION OF A MAGNETIC PHASE TRANSITIONAL THIN FILM

(71) Applicant: The Government of the United States of America, as represented by the Secretary of the Navy, Arlington, VA (US)

(72) Inventors: Steven P. Bennett, Accokeek, MD (US); Cory D. Cress, Springfield, VA (US); Joseph Prestigiacomo, Huntington, MD (US); Olaf M. J. van 't Erve, Falls Church, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 669 days.

(21) Appl. No.: 16/898,851

(22) Filed: Jun. 11, 2020

(65) Prior Publication Data

US 2020/0395156 A1 Dec. 17, 2020

Related U.S. Application Data

(60) Provisional application No. 62/859,927, filed on Jun. 11, 2019.

(51) Int. Cl.
*H01F 10/00* (2006.01)
*H01F 10/14* (2006.01)
(Continued)

(52) U.S. Cl.
CPC ........... *H01F 10/002* (2013.01); *H01F 10/14* (2013.01); *H01F 10/28* (2013.01); *H01F 41/00* (2013.01)

(58) Field of Classification Search
None
See application file for complete search history.

(56) References Cited

U.S. PATENT DOCUMENTS

| | | | | |
|---|---|---|---|---|
| 6,387,476 B1 * | 5/2002 | Iwasaki | .................... | G11B 5/65 428/847.5 |
| 2007/0020486 A1 | 1/2007 | Berger et al. | | |
| 2020/0126697 A1 * | 4/2020 | Trassinelli | ............. | B01J 19/122 |

FOREIGN PATENT DOCUMENTS

| | | | | |
|---|---|---|---|---|
| WO | WO2018189260 | * 10/2018 | ............... | H01F 1/01 |

OTHER PUBLICATIONS

Zheng "Epitaxial strain controlled magnetocrystalline anisotropy in ultrathin FeRh/MgO bilayers" AIP Adv. 7, 055914, Jan. 11, 2017 (Year: 2017).*

(Continued)

*Primary Examiner* — Mandy C Louie
(74) *Attorney, Agent, or Firm* — US Naval Research Laboratory; Joseph T. Grunkemeyer

(57) ABSTRACT

Also disclosed herein is an article having a substrate and a layer of an FeRh alloy disposed on the substrate. The alloy has a continuous antiferromagnetic phase and one or more discrete phases smaller in area than the continuous phase having a lower metamagnetic transition temperature than the continuous phase. Also disclosed herein is a method of: providing an article having a substrate and a layer having a continuous phase of an antiferromagnetic FeRh alloy disposed on the substrate and directing an ion source at one or more portions of the alloy to create one or more discrete phases having a lower metamagnetic transition temperature than the continuous phase.

33 Claims, 16 Drawing Sheets

(51) Int. Cl.
*H01F 10/28* (2006.01)
*H01F 41/00* (2006.01)

(56) References Cited

OTHER PUBLICATIONS

Mariager "Imaging the antiferromagnetic to ferromagetic first order phase transition of FeRh" cond-mat material sci Jan. 17, 2013 (Year: 2013).*
Koide "Magnetic patterning of FeRh thin films by energetic light ion microbeam irradiation" Japan Society of App Physic 53 05 FC06 (Year: 2014).*
Kita "Magnetization control for bit pattern formation of spinel ferromagnetic oxides by Kr ion implantation" Jou App Physics vol. 115, Iss 17 May 7, 2014 (Year: 2014).*
Dobisz et al "Patterned Media: Nanofabrication Challenges of Futre Disk Drives" Invited paper 2008.*
Bennett et al., "Magnetic order multilayering in FeRh thin films by He-Ion irradiation" Mater. Res. Lett. 6(1), 106-112 (2017).
Bennett et al., "Direct Evidence of Anomalous Interfacial Magnetization in Metamagnetic Pd doped FeRh Thin Films" Scientific Rep., 5, 9142 (2015).
Bennett et al., "Metamagnetism: Nanoscale Manipulation and Low Power Triggering of Magnetic Ordering" The 30th Magnetic Recording Conference, Minneapolis, MN (Jul. 2019).
Search report and written opinion in PCT/US2020/037225 (Sep. 22, 2020).
Chen et al. "A magnetic glass state over the first-order ferromagnetic-to-antiferromagnetic transition in FeRh film" Materials Research Letters, 5(5), 329-334 (2017).
Fina et al. "Electric-Field-Adjustable Time-Dependent Magnetoelectric Response in Martensitic FeRh Alloy" ACS Applied Materials & Interfaces, 9(18), 15577-15582 (2017).
Bordel et al. "Fe spin reorientation across the metamagnetic transition in strained FeRh thin films" Physical Review Letters, 109(11), 117201 (2012).

* cited by examiner

PATTERN WRITING OF MAGNETIC ORDER USING ION IRRADIATION OF A MAGNETIC PHASE TRANSITIONAL THIN FILM

This application claims the benefit of U.S. Provisional Application No. 62/859,927, filed on Jun. 11, 2019. The provisional application and all other publications and patent documents referred to throughout this nonprovisional application are incorporated herein by reference.

TECHNICAL FIELD

The present disclosure is generally related to magnetic thin films.

DESCRIPTION OF RELATED ART

The recent advent of antiferromagnetic spintronics has brought a new toolbox of ultra-high speed spin physics to the nanoscale electronics community.[1-4] The community is currently racing to understand the fundamental physics of a sought-after antiferromagnetic memory by building test device configurations to probe new types of antiferromagnetic materials and device geometries. The vast majority of these studies rely on the creation of multiple magnetic orderings in intimate contact using both lateral[5,6] and vertical[3,4] heterostructures of multiple materials. The ability to monolithically couple regions of antiferromagnetic and ferromagnetic order, similar to that achieved in thin films of $FePt_3$ for paramagnetic to ferromagnetic coupling,[7] could eliminate the complications associated with interfaces and concomitant interfacial polarization losses, thus yielding a uniquely capable material system for applications in the antiferromagnetic spintronics domain. FeRh, a room temperature antiferromagnet which exhibits a process-tunable antiferromagnetic to ferromagnetic (i.e., metamagnetic) transition above room temperature,[8] is a top candidate material for this role.

FeRh is a binary metallic compound with a unique metamagnetic transition from antiferromagnetic (AF) to ferromagnetic (FM) ordering at ~360 K in the bulk, resulting in an unparalleled change in magnetization (~800 emu/cc) and a ~1.0% lattice expansion.[9] The relatively high temperature of this transition distinguishes FeRh from all other metamagnetic materials whose transitions are at or below room temperature (e.g., $FeCl_2$ (~20 K),[10] La(Fe, $Si)_{13}$ (~200 K),[11] $UPt_3$ (~1.5 K),[12] $YMn_6Sn_{6-x}Ti_x$ (~293 K)[13]). Much of the current understanding of the FeRh metamagnetic transition derives from studies of bulk material nearly 60 years ago.[9,14,15] A resurgence of interest is driven by its potential use in a plethora of thin-film based applications including magnetic memory,[16,17] antiferromagnetic electronics,[16,18,19] and magnetocalorics.[20] Recent work on FeRh has demonstrated a very high sensitivity to strain[21-25] as well as ultra-high speed critical point dynamics.[26] Additionally, the origin of the microscopic driving force for the transition has been the focus of numerous theoretical studies,[27-30] which have not led to a consensus.

Integration of FeRh into new antiferromagnetic spintronic applications relies on both controlling (i.e., tuning the temperature) and establishing a trigger (a switch) for the metamagnetic transition. To tune the transition temperature, a number of studies have demonstrated the effects of dilute alloys wherein transition metals, such as Pt, Pd, Ir, Cu, Au, etc., incorporated at ~0.1-5% concentration, either decrease or increase the transition temperature.[31-33] However, more recently it has been shown that the direct incorporation of defects that do not change the composition, by either light or heavy ion irradiation, can be highly effective at reducing the transition temperature.[8,34-41]

BRIEF SUMMARY

Disclosed herein is an article comprising: a substrate and a layer of an FeRh alloy disposed on the substrate. The alloy comprises: a continuous antiferromagnetic phase and one or more discrete phases smaller in area than the continuous phase having a lower metamagnetic transition temperature than the continuous phase.

Also disclosed herein is a method comprising: providing an article comprising a substrate and a layer comprising a continuous phase of an antiferromagnetic FeRh alloy disposed on the substrate and directing an ion source at one or more portions of the alloy to create one or more discrete phases having a lower metamagnetic transition temperature than the continuous phase.

BRIEF DESCRIPTION OF THE DRAWINGS

A more complete appreciation will be readily obtained by reference to the following Description of the Example Embodiments and the accompanying drawings.

FIG. 15A shows a diagram of dose test grid for sample measured in FIGS. 15B-C. FIG. 15B shows CAFM current measurement in log scale showing a strong dependence of current on dose. FIG. 15C shows CAFM height measurement showing small changes in height due to He+ exposure. FIG. 15D shows CAFM current measurement in log scale of 50 nm square pixels written with a pitch of 100 nm. FIG. 15E shows CAFM height measurements corresponding to FIG. 15D. FIG. 15F shows CAFM current measurement in log scale of spot array exposure with a dose of $2.0\times10^5$ $He^+$/spot.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed is the demonstration of the use of a helium ion microscope (HIM) to directly write nanoscale regions of controlled magnetic ordering in a film of FeRh, which exhibit either AF order or FM order, and tune the AF-FM metamagnetic transition temperature over a 125 K range. As a focused ion beam technique, but with a nearly atomic scale beam, HIMs continue to find a broadening application space beyond microscopy, to include high-precision ion milling,[42] irradiation studies with submicron features,[43] and precise defect engineering.[44,45] Using the HIM, and through a combination of optical microscopy, magneto-optic Kerr effect (MOKE) imaging, and conductive atomic force microscopy (CAFM) it is shown that nanoscale regions can be reproducibly written in confined geometries down to 25 nm. First-principles calculations based on density functional theory are used to study the impact of probable $He^+$ induced point defects and to quantify their influence on the spin-flip energy, a parameter related to the metamagnetic transition temperature.

Films of FeRh are known to exhibit a unique antiferromagnetic (AF) to ferromagnetic (FM) transition above room temperature, known as the metamagnetic phase transition.[15] FeRh is a unique material that changes its intrinsic magnetic order at an ambient temperature.[8] This highly unusual metamagnetic transition offers the possibility to switch between the two magnetic phases by external perturbation, such as temperature, offering completely new avenues for magnetism-based technology.[22]

Figure 1:
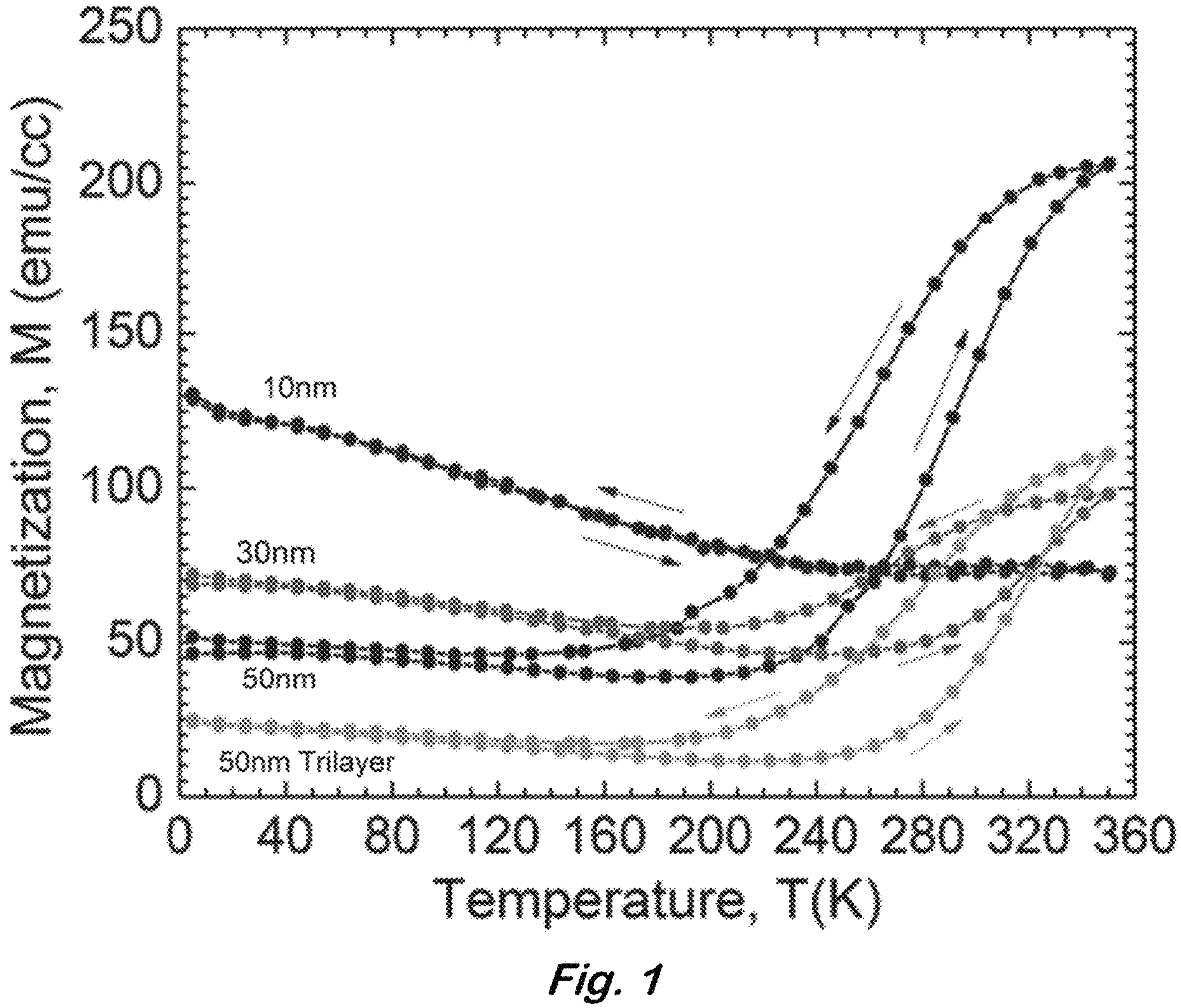
FIG. 1 shows saturation magnetization curves as a function of temperature for FeRh single layer films with palladium doping taking with 1 T applied field grown at 600° C. with varying thicknesses: 50 nm, 30 nm and 10 nm.[67]

FIG. 1 demonstrates the drastic change in magnetization (M) when an FeRh film is driven from its AFM phase to FM phase and back by temperature cycling of the sample. The magnetic phase exhibits hysteresis while temperature cycling the sample, as it takes more energy to change back from one phase to the other. This magnetic phase change is also seen in the temperature dependence of the resistance, since the spin dependent scattering in the AFM phase is higher than it is in the FM phase.

The successful direct write of ferromagnetic patterns in an antiferromagnetic medium, such as FeRh, has been demonstrated by first growing the FeRh antiferromagnetic film with thickness 30 nm at 600° C. on MgO. Then a He-ion microscope is utilized to implant He ions with a specific energy, as determined by the microscope settings, into a 100 by 100 um square area. This sample was then transferred to a Magneto Optical Kerr Effect Microscope to characterize the local magnetic properties.

This technique can be used to fabricate discrete magnetic media for ultra-high density magnetic data storage.[68] The ultimate magnetic medium for use in magnetic recording would use a single magnetic domain for each magnetic bit. This is not possible with continuous magnetic media, since a single magnetic domain would not be stable enough to allow it to be used for data storage. Many domains are required for a stable magnetic bit and this puts a restriction on the minimum possible bit size.

If one can isolate a single domain from its magnetic environment, one can overcome these restrictions, and thus significantly reduce the bit size and increase data density.

This technique can also be used to realize in-plane antiferromagnetic electronics. The ability to write antiferromagnetic/ferromagnetic ordering without discrete interphases of different materials opens up planar geometries. These planar geometries, unlike heterostructures of different materials, eliminate interfaces which cause spin polarized carrier scattering in spintronics and antiferromagnetic spintronics.

Figure 2:
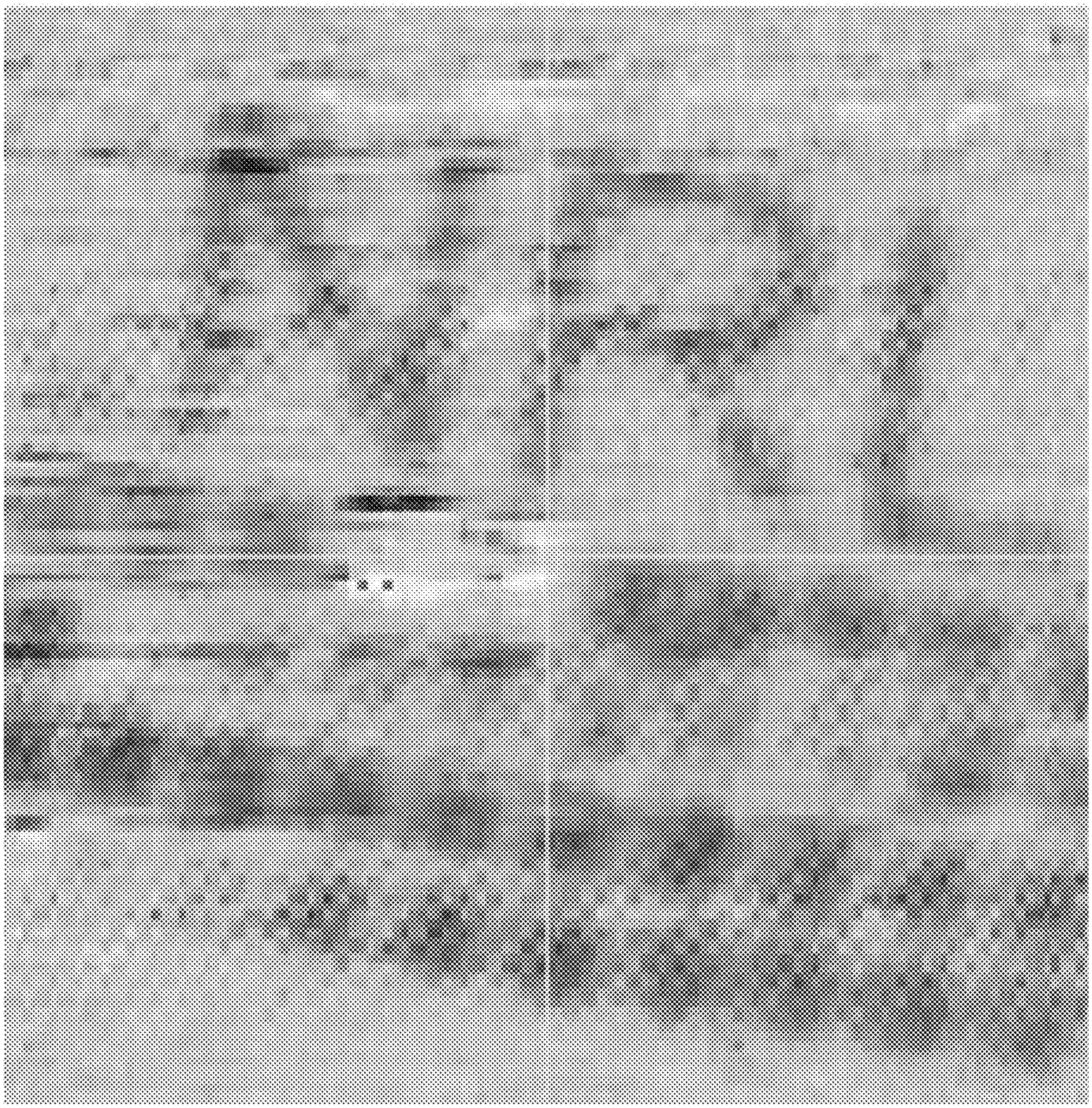
FIG. 2 shows the effect of $He^+$ ion dose on the MOKE signal (i.e., Kerr rotation) at room temperature for a series of $He^+$ ion doses.

This can be done by dosing a small area of FeRh with $He^+$ ions. This area will then be ferromagnetic inside an otherwise antiferromagnetic thin film, effectively creating a discrete magnetic medium out of an otherwise uniform thin film. The $He^+$ ions can also be used to create an antiferromagnetic region inside, or spatially isolated by a region with ferromagnetic ordering. Both of these features can be observed in FIG. 2, which shows that arbitrary patterns can be written using the direct write mode with the $He^+$ ion beam found inside a He microscope.

Figure 3:
FIG. 3 shows the same as FIG. 2, but at 150 K.

Besides shape, using the direct write technique also allows one to arbitrarily dose regions next to one another in order to achieve different FM/AFM magnetic properties along the substrate. This is observed if one compares FIG. 2 and FIG. 3, which show the MOKE image of the same sample, FIG. 2 was imaged at RT and FIG. 3 was imaged at 150 K. These images show that the temperature dependence of the FM to AFM switch depends on $He^+$ dose.

Alternatively, patterns can be written arbitrarily by using a hard mask with a uniform $He^+$ ion radiation.

Figure 4:
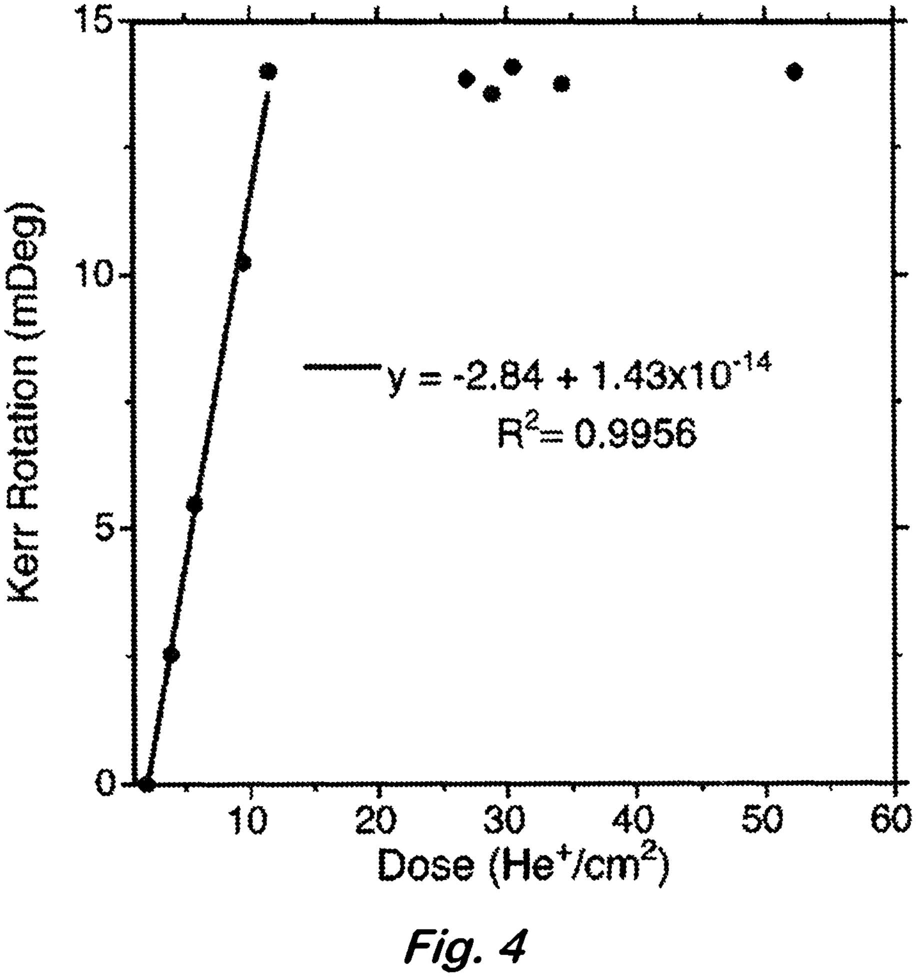
FIG. 4 shows Kerr Rotation as a function of $He^+$ ion implantation dose.

In FIG. 4, the effect of $He^+$ ion dose on the MOKE signal (i.e., Kerr rotation) for a series of $He^+$ ion doses is reported. The Kerr rotation is within the noise for all 30 keV $He^+$ ion doses below $1.9\times10^{14}$ $He^+$ $cm^{-2}$. Beyond that dose, the Kerr rotation increases linearly with dose up to $1.2\times10^{15}$ $He^+$ $cm^{-2}$ with a slope of $1.43\times10^{-14}$, where it saturates with a Kerr rotation of approximately 14 mdeg. This range of saturated Kerr signal corresponds with the FeRh that has transitioned into ferromagnetic ordering. At lower doses, the FeRh still transitions through a metamagnetic transition as discussed above. The difference, is that at room temperature, the material has partially transitioned giving rise to a small, but non-zero Kerr rotation.

This technique enables a single layer metamagnetic memory/logic manipulated by spin orientation (FM regions) or magnetic ordering (FM vs AFM) with higher resolution since heat diffusion is absent. Each FM region can have different metamagnetic transition temperature. This leads to temperature-dependent memory states that are stable to thermal cycling.

The disclosed article includes a substrate with a layer of an FeRh alloy disposed on the substrate. One suitable substrate is a MgO substrate. However any substrate that is compatible with the alloy and does not cause undesired magnetic properties in the alloy may be used. The alloy may be deposited by sputtering or any other technique that produces to the FeRh layer. The FeRh layer may be of any thickness. One suitable thickness range is 10-30 nm.

Initially, the FeRh layer may be a continuous phase of an antiferromagnetic FeRh. That is, the entire layer, or a relevant portion of it, may be antiferromagnetic throughout at room temperature or at temperatures above room temperature and below the metamagnetic transition temperature of the alloy. Discrete regions or phases having a lower metamagnetic transition temperature may be formed within the continuous antiferromagnetic phase by directing an ion source at the regions desired to be converted.

The ion source may be in the form of a beam. One suitable ion source is a $He^+$ ion beam, which may have a diameter of up to 5 nm. Such a beam may be generated by a helium ion microscope. The beam may be directed to the specific regions to be converted. Each of the discrete phases may be separated from each other and each may be surrounded by the continuous phase or the edge of the alloy layer. The discrete phases may be in the form of an array so that they may be addressable. One or more of the discrete phases may have an area of 1000 $\mu m^2$ or less or 1000 $nm^2$ or less.

In another embodiment, the ion source may be more widely dispersed, possibly covering the entire alloy layer. A mask may be used so that only the regions desired to be converted are exposed to the ions.

In another embodiment, an electron source is used to create the discrete phases. The electrons source may be in the form of a beam having a diameter of, for example, no more than 5 nm. The kinetic energy of the electrons may be, for example, 300-460 keV or above.

The discrete phases may still be antiferromagnetic at room temperature, as is the continuous phase. When the temperature of the article is raised to above the metamagnetic temperature of the discrete phases but below the metamagnetic temperature of the continuous phase, the alloy layer will have discrete ferromagnetic phases in an antimagnetic continuous phase. The metamagnetic temperature of the discrete phases may be, for example, 20-140° C.

When the discrete phase is ferromagnetic, its magnetic polarization may be oriented in a desired direction by known methods of magnetic polarization. At a later time the presence, absence, and/or location of any ferromagnetic discrete phases can be detected, and the orientation of the magnetic polarization may be measured by known methods. The orientation will be retained even if the temperature drops below the metamagnetic temperature as is raised again. Different discrete phases may be oriented in different directions. By these methods, information may be stored in and retrieved from the alloy layer.

In another embodiment, the dose of the ion source is adjusted when exposing two of more discrete regions to form at least two discrete phases having different metamagnetic transition temperatures, also different from that of the continuous phase. This allows for detecting the presence, absence, location, and/or magnetic polarization of the discrete phases at different temperature and obtaining different measurements at the different temperatures.

The phenomenon of superparamagnetism ordinarily limits the density of ferromagnetic domains in order for the individual domains to retain their magnetic orientation. However, the presently disclosed discrete ferromagnetic FeRh domains may have a superparamagnetic limit that exceeds that of the untreated continuous FeRh phase. The discrete phases may be place with a size and pitch that exceeds the size and pitch at the superparamagnetic limit of the continuous FeRh phase, when the continuous phase is above its metamagnetic temperature. The ion treatment can increase the maximum information storage density of FeRh.

In another embodiment, the metamagnetic temperature of the discrete phases may be further altered by the use of a piezoelectric substrate. For example, a voltage may be applied to an addressable portion of the substrate adjacent to a discrete phase. The resulting strain can alter the metamagnetic temperature of that discrete phase. Detecting the phase and its orientation may be done with or without the applied voltage.

The following examples are given to illustrate specific applications. These specific examples are not intended to limit the scope of the disclosure in this application.

FeRh Thin Film Growth—For this study, 200 nm thick epitaxial films of $Fe_{0.52}Rh_{0.48}$ were grown on single crystal MgO (001) substrates using magnetron sputtering from a stoichiometric FeRh target in a 5 mTorr Ar atmosphere. The substrate temperature was fixed at 630° C. during growth and a post-growth anneal was performed in 5 mTorr Ar for 1 h at 730° C.

X-ray Analysis—X-ray diffraction (XRD) was performed to assess the initial crystalline quality of the films using the Cu-kα line of a Rigaku X-ray diffractometer with a rotating anode and the sample temperature cycled between 300 K to 450 K.

Transmission Electron Microscopy Preparation and Analysis—An FEI Nova 600 NanoLab dual-beam, focused ion beam (Ga)/scanning electron microscope (FIB/SEM) system providing high-resolution ion milling and secondary electron imaging capability was employed to isolate and lift-out a thin foil of FeRh for subsequent transmission electron microscopy (TEM). Following lift-out, the foil was thinned and cleaned using the FIB with progressively lower accelerating voltages down to 2 kV. HRTEM images were collected using a JEOL JEM-2200FS at 200 kV and diffraction patterns were collected using a FEI Tecnai G2 at 300 kV.

Site-Selective He Ion Irradiation—Using a Zeiss ORION NanoFab helium ion microscope, direct-write patterns were formed consisting of large area (20 μm×20 μm), and small area (≤2 μm×≤2 μm), squares in FeRh films with 30 keV $He^+$ for subsequent characterization via optical and CAFM, respectively. In all cases, the irradiations were performed at normal incidence and controlled by the NanoFab Nanopatterning and Visualization Engine software, with the patterning direction along the x-axis leading to a y-axis raster direction. For larger regions, a 40 μm aperture, 23.7 pA beam current, pixel spacing of 3.7 nm were used and the dwell time and number of replicates were varied to achieve a wide-range of doses from $1\times10^{14}$ to $8\times10^{16}$ $He^+$ $cm^{-2}$. Small scale features included a series of 2 μm×2 μm uniformly dosed squares with doses ranging from $4.5\times10^{13}$ $He^+$ $cm^{-2}$ to $3.6\times10^{16}$ $He^+$ $cm^{-2}$, and arrays of nanoscale squares each filling a 2 μm×2 μm area, with sizes/pitches of 200 nm/400 nm, 100 nm/200 nm, 50 nm/100 nm, and 25 nm/100 nm. Each nanoscale feature was dosed to the same level of $3.6\times10^{16}$ $He^{+}$ $cm^{-2}$ for an effective areal dose of $8.75\times10^{15}$ $He^{+}$ $cm^{-2}$ averaged over the 2 μm×2 μm region. This dose level was chosen to ensure the nanoscale features consist of fully saturated FM ordering. To push the ultimate scaling limits of the NanoFab, a spot array was patterned with a spot dose of $2\times10^{5}$ $He^{+}$ and pitch of 50 nm, which has approximately the same total ions per region and pitch as the 25 nm/50 nm square pattern array. For all nanoscale features, the beam focus was maximized by employing a single exposure with a beam current of ~0.7 pA and pixel spacing of 0.25 nm, and varying the dwell time to achieve the desired dose.

Temperature Dependent Optical Microscopy—Temperature-dependent optical microscopy images were captured using a Nikon optical microscope and LabVIEW controlled heated vacuum stage. Brightness and contrast remained constant for all images, and at each temperature the sample was allowed to equilibrate for >5 min prior to refocusing and capturing an image. Refocusing was unavoidable due to thermal expansion of the stage and sample over the large temperature range investigated.

Magneto-Optic Kerr Effect Imaging—Temperature dependent longitudinal MOKE imaging and magnetization studies were performed using a Quantum Design nanoMOKE3. A Montana cryostat extension was used for the measurements below room temperature and an Oxford cryostat was used for heating the sample above room temperature. The Kerr signal was taken using a 10 μm spot-size, which fit well within the 25 μm by 25 μm irradiated squares, and imaging was done by scanning this laser spot across the sample.

Thin-film Conductivity Measurements—Four probe van der Pauw conductance measurements were performed using a modified Advanced Research Systems (ARS) probe station with programmed temperature cycling.

Conductive Atomic Force Microscopy—CAFM measurements were performed on a Keysight 9500 AFM using nanocrystalline doped diamond coated cantilevers (BudgetSensors AIO-DD). During measurements, the sample chamber was continuously purged with nitrogen. Bias applied to the sample causes current to flow between the sample and tip, which is measured with a current amplifier attached to the tip.

Density Functional Theory—Density functional theory calculations used the projector-augmented wave (PAW) method[63] as implemented in the VASP code[64] with the generalized gradient approximation defined by the Perdew-Burke-Ernzerhof (PBE)[65] functional. The Fe and Rh PAW potentials were used that treat the s, p, and d states as valence, and a plane-wave energy cutoff of 400 eV. Structural relaxation of the lattice parameters and internal coordinates of the unit cell were carried out with a 12×12×12 k-point grid and a force convergence criterion of 5 meV $Å^{-1}$. To correctly describe the magnetic moments of Fe, a spherically averaged Hubbard correction was used within the fully localized limit double-counting subtraction.[66] A U-J value of 1 eV was applied to the Fe d-states, which leads to a magnetic moment on Fe in the FM and AF phase that is in agreement with experiment.[57] To study the effects of biaxial strain, "strained-bulk" calculations were performed where compressive and tensile equi-biaxial strain was imposed on the in-plane lattice parameters of the FeRh unit cell and the out-of-plane lattice parameter and all atomic positions of the unit cell were optimized. Calculations on MgO used the same k-point grid, force convergence criterion, and a 600 eV plane-wave energy cutoff.

Calculations of defects in FeRh were carried out using 6×6×6 supercells of the primitive cubic cell (432 atoms total), constructed using the lattice vectors of the fully optimized AF FeRh cubic unit cell. Defects that preserve the stoichiometry, namely Frenkel (same species vacancy and interstitial) pairs and antisite pairs were examined. The positions of the two-point defects in each supercell were chosen to maximize their distance. The atomic coordinates of each defect configuration were optimized with FM and AF order imposed at fixed volume and used Γ-point Brillouin zone sampling for the defect calculations. The energy difference between the two magnetic orders at the AF-relaxed positions was also evaluated.

Figure 5:
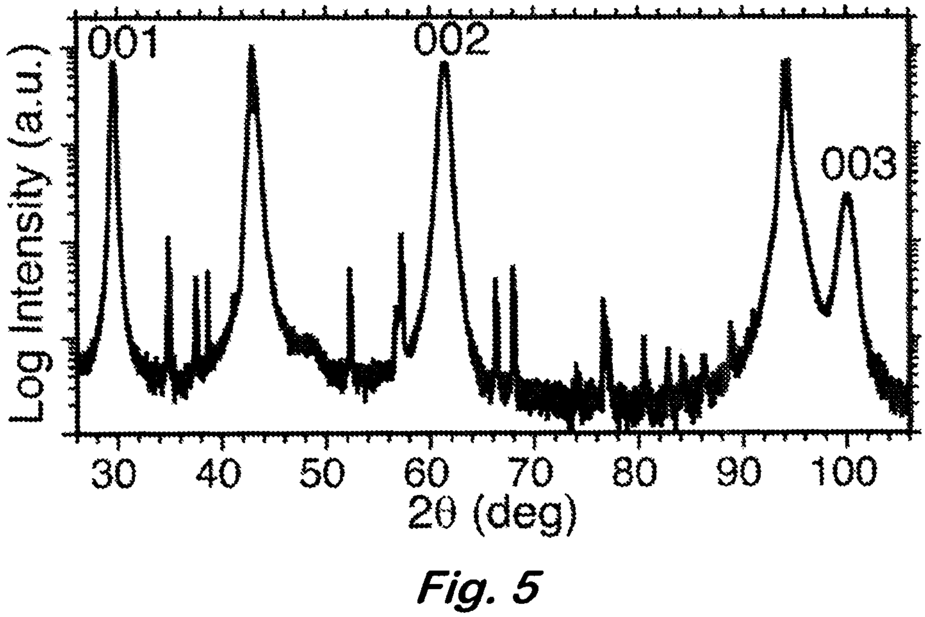
FIG. 5 shows an XRD θ-2θ scan with FeRh reflections indexed.
Figure 6:
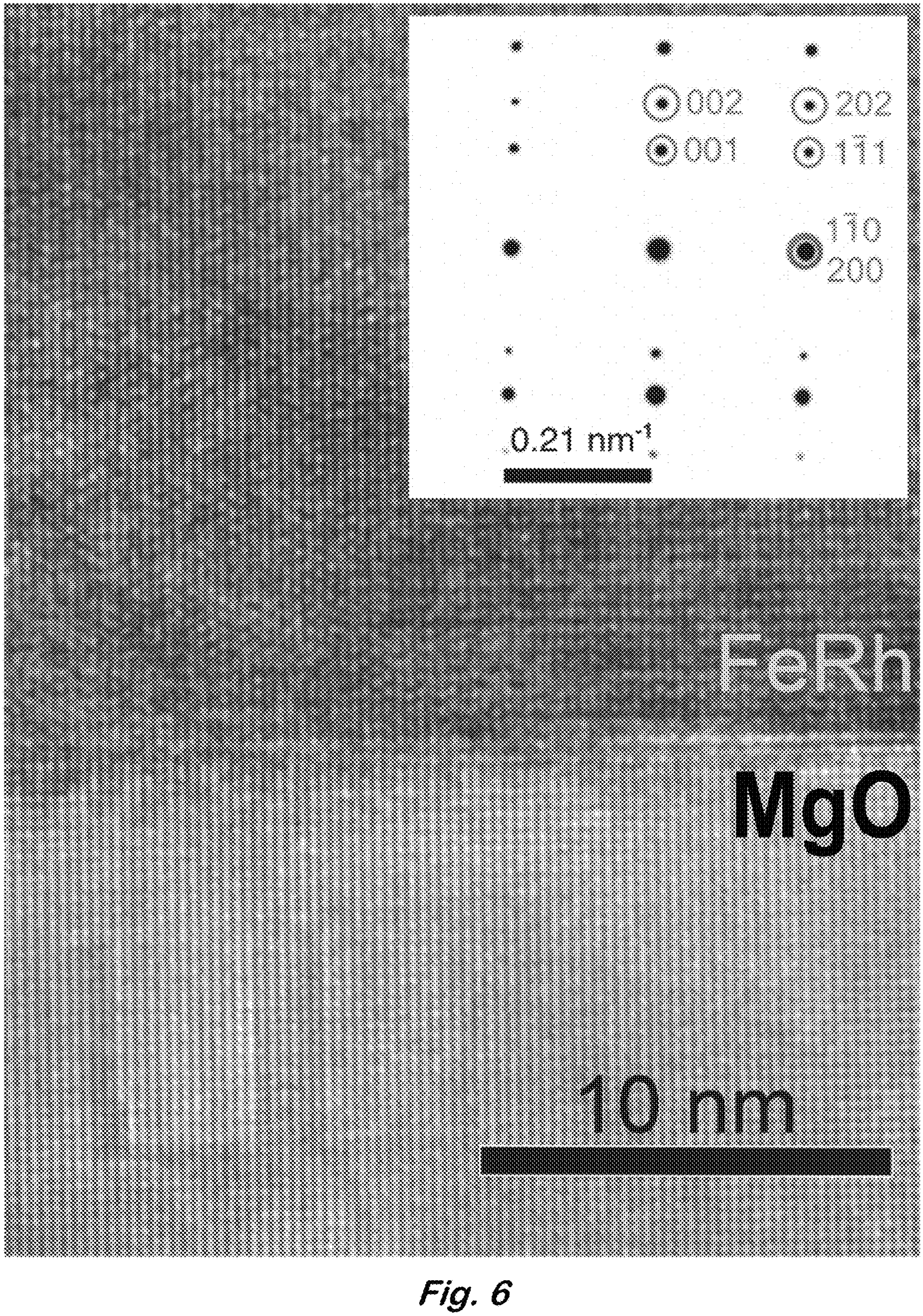
FIG. 6 shows an HR-TEM image of the FeRh—MgO interface and the corresponding SADP pattern.
Figure 7:
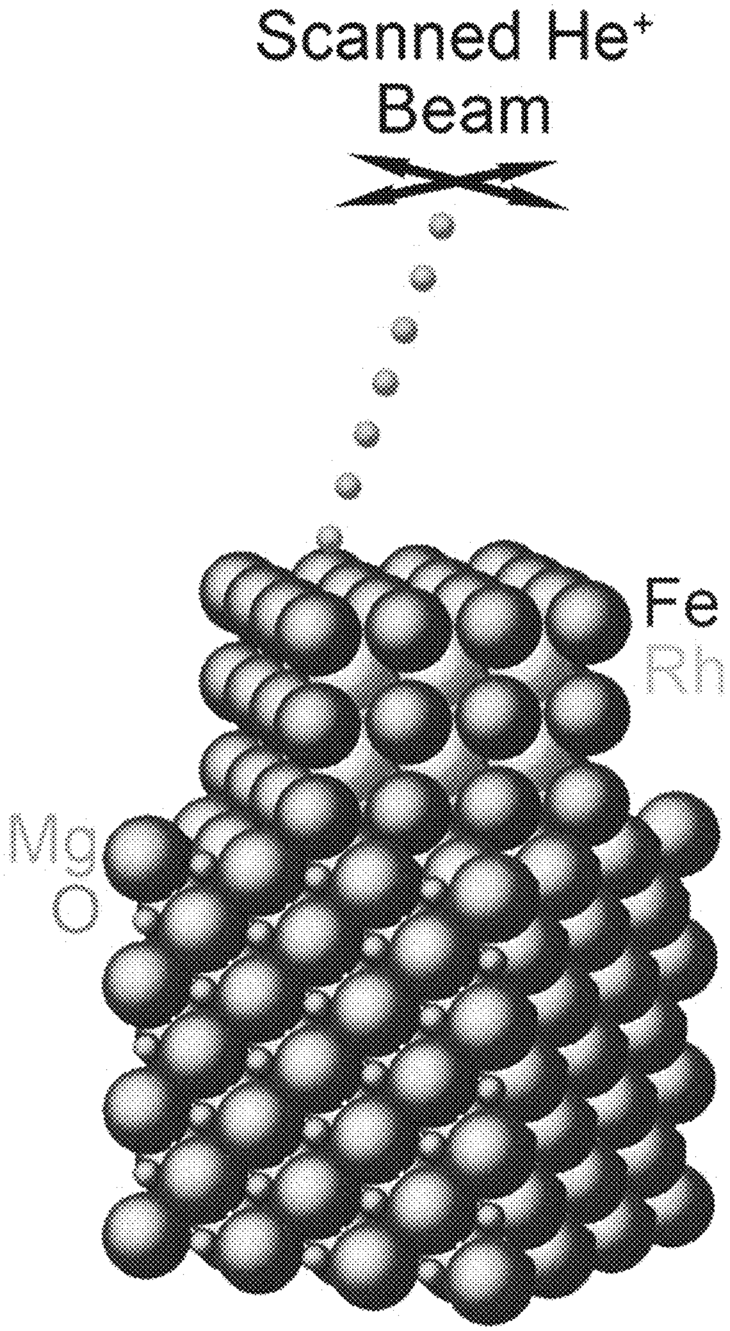
FIG. 7 shows a schematic depiction of the sample layers and processing of the films; a $He^+$ beam is scanned over the surface of the FeRh.

FIG. 5 shows the θ-2θ x-ray diffraction (XRD) pattern of a 200 nm thick FeRh film grown by sputter deposition on MgO(001). Each of the primary FeRh reflections are labeled, and the other intense reflections belong to the MgO substrate. The third order peak position (003) of 2θ=100.036° corresponds to a c-axis lattice spacing of ~3.02 Å, while the FWHM of 0.4° for the (001) reflection is indicative of fully-dense phase-pure epitaxial near-stochiometric FeRh films.[46] Temperature dependent XRD measurements reveal the characteristic expansion in lattice parameter, and crystallite size with temperature, consistent with a first order transition. Additionally, atomically thin slices through the FeRh/MgO (001) interface were prepared using standard focused ion beam (FIB) lift-out techniques for high-resolution transmission electron microscopy (HR-TEM) analysis. The HR-TEM lattice image and selected area electron diffraction pattern (SADP) shown in FIG. 6 confirm the fully-dense nature and epitaxial alignment of the FeRh to the MgO substrate. The three-dimensional representative schematic in FIG. 7 shows the 45° rotated growth of FeRh and MgO [100] crystal axes, which is confirmed by the SADP of FIG. 6 where overlapping in-plane $(1\bar{1}0)$-FeRh and (001)-MgO reflections are observed.[8,18,22]

Figure 8:
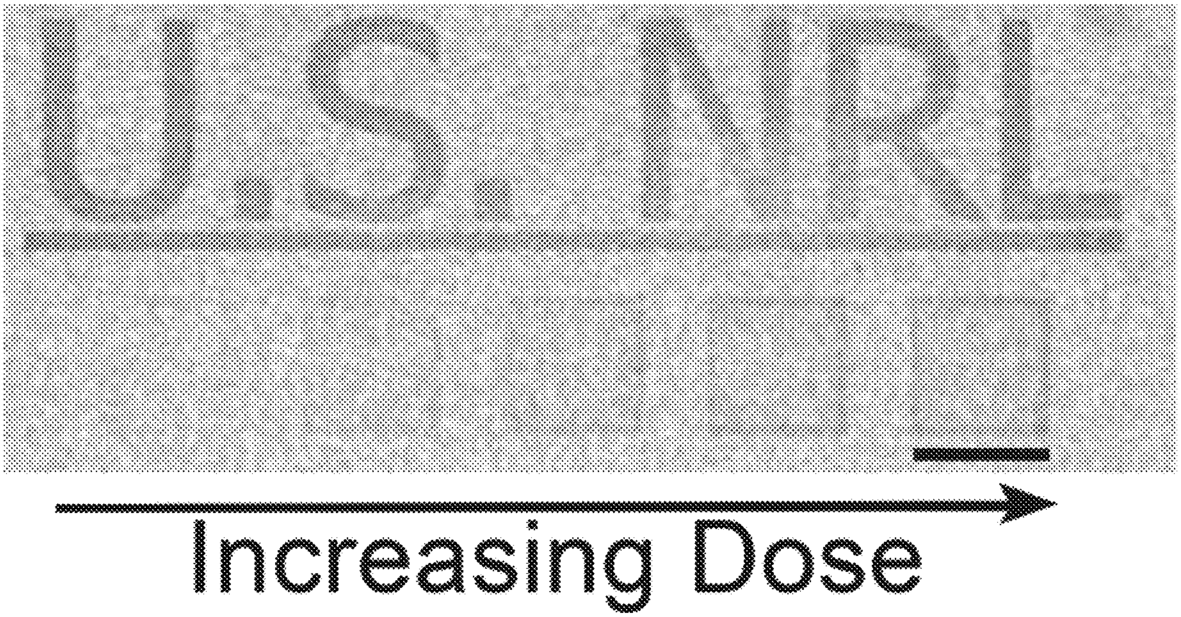
FIG. 8 shows a helium ion micrograph of an FeRh film surface immediately after implantation revealing greater contrast in the highest dose regions (dose: $1.1\times10^{14}$, $2.2\times10^{14}$, $4.0\times10^{14}$, $6.2\times10^{14}$, and $8.0\times10^{14}$ $He^+$ $cm^{-2}$; U.S. NRL lettering dose $1\times10^{15}$ $He^+$ $cm^{-2}$). Scale bar: 20 μm.

The highly focused 30 keV $He^{+}$ beam (diameter <1 nm) of a HIM was employed to achieve spatially controlled regions of FeRh with dose-dependent metamagnetic transition temperatures ($1\times10^{14}$<$He^{+}$ dose <$5\times10^{16}$ $cm^{-2}$). Following the automated pattern writing process, a short-integration/low-resolution (i.e., $He^{+}$ dose <$1\times10^{11}$ $He^{+}$ $cm^{-2}$) helium ion micrograph of the processed region (FIG. 8) was captured, which shows a dose-dependent contrast. The origin of the contrast is hypothesized to stem from the changed conductivity throughout the volume of the dosed regions and differing surface work function, which changes the secondary electron emissivity. A thin (<10 nm) layer of deposited carbon, primarily at the edges of the highest dosed features and common to such focused ion beam processes, may also contribute to the image contrast.[47-49]

Figure 9:
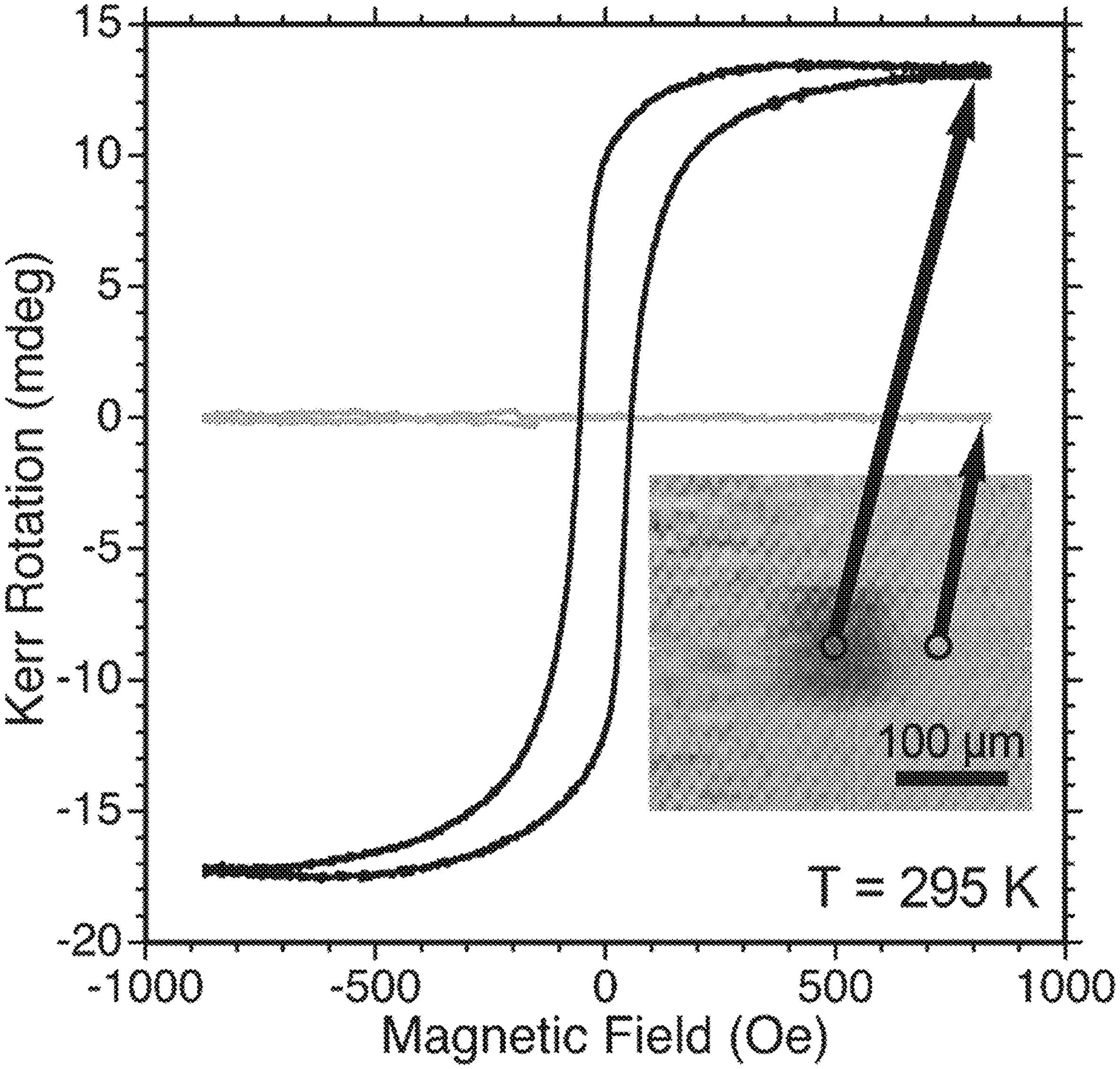
FIG. 9 shows Kerr rotation vs. magnetic field for a pristine FeRh film (horizontal line) and within a square region dosed with $8.5\times10^{15}$ $He^+$ $cm^{-2}$ (curved line). Inset: Corresponding MOKE image illustrating the magnetic contrast in the dosed region; scale bar: 100 μm.

Both MOKE microscopy and optical microscopy were employed to investigate the $He^{+}$ dose-dependent changes in the FeRh films. FIG. 9 displays the room temperature Kerr rotation as a function of in-plane magnetic field (longitudinal MOKE geometry) for a region of the as-grown FeRh film and an adjacent region implanted with ~$8.5\times10^{15}$ $He^{+}$ $cm^{-2}$. The inset of FIG. 9 contains a MOKE image taken at ~850 Oe which depicts a region of high contrast (i.e., high Kerr rotation) coinciding with the $He^{+}$ implanted region. The effect of implantation is clearly evident when comparing it with the room-temperature magnetic-field-dependent Kerr rotation measurement of the pristine film. In the AF state, the pristine FeRh displays no Kerr response. Conversely, the $He^{+}$ implantation causes the magneto-structural transition of FeRh to shift below room temperature, producing the FM state and leading to Kerr rotation that mimics a typical magnetization hysteresis loop consistent with a FM domain. These results are consistent with prior results of broad-area irradiation studies with low energy He,[8] Ne,[38,40,50,51] and Ga ion,[40] and swift heavy ions including Ni, Kr, Xe, and Au.[52]

Figure 10:
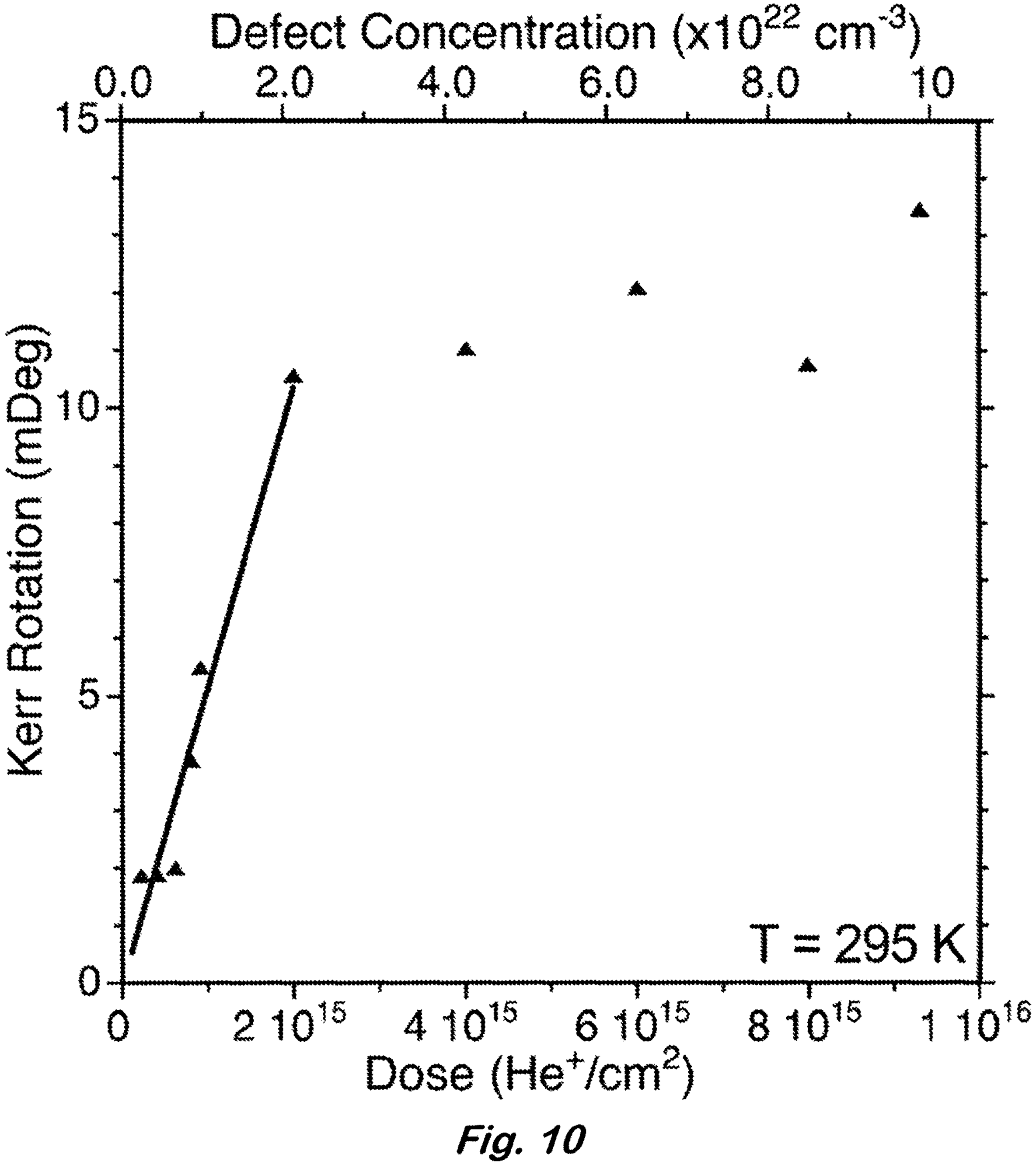
FIG. 10 shows Kerr rotation as a function of $He^+$ dose.

The ability to direct-write multiple features into a single FeRh film enables measuring the room temperature Kerr rotation simultaneously for a series of different doses. In FIG. 10 the room-temperature Kerr rotation for $He^+$ doses ranging from ~$1\times10^{14}$ $He^+$ $cm^{-2}$ to $1\times10^{16}$ $He^+$ $cm^{-2}$ are investigate. Here a dose-dependent linear increase in Kerr rotation is observed with the sample reaching a saturated Kerr rotation of 12.5 mdeg at a dose of ~$2\times10^{15}$, and persisting beyond $1\times10^{16}$ $He^+$ $cm^{-2}$. In the linear regime, the slope is 5.2 mdeg per $10^{15}$ $He^+$ $cm^{-2}$. Transport of Ions in Matter (TRIM) simulations determine a mean penetration depth of 110 nm with a longitudinal straggle of 46 nm, meaning a majority of the $He^+$ come to rest within the base of the film near the MgO substrate.[53] The peak defect concentration also occurs in this location. In contrast, the peak ionizing energy loss occurs within the top 50 nm of the film and decreases approximately linearly with depth. Using a computed value of 212 defects per ion based on TRIM simulations, the saturating dose of $2\times10^{15}$ $He^+$ $cm^{-2}$ yields a mean defect density of $1.6\times10^{22}$ $cm^{-3}$. Interestingly, the onset of FM saturation is similar to the saturated magnetization reported for a defect concentration of ~$1.5\times10^{22}$ $cm^{-3}$ induced by 20 keV $Ne^+$ irradiations (measured by SQUID/VSM) in 35 nm FeRh films.[40] This close correlation is achieved despite the fact that 20 keV $Ne^+$ ions have a nuclear stopping power ~30× greater than 30 keV $He^+$.[53,54] Greater defect generation rates typically yield larger defect clusters; therefore, the fact that saturation occurs at approximately the same total defect concentration (all Frenkel pairs treated as one defect) suggests that point defects are sufficient to modify the metamagnetic transition rather than a particular defect complex.

Figure 11:
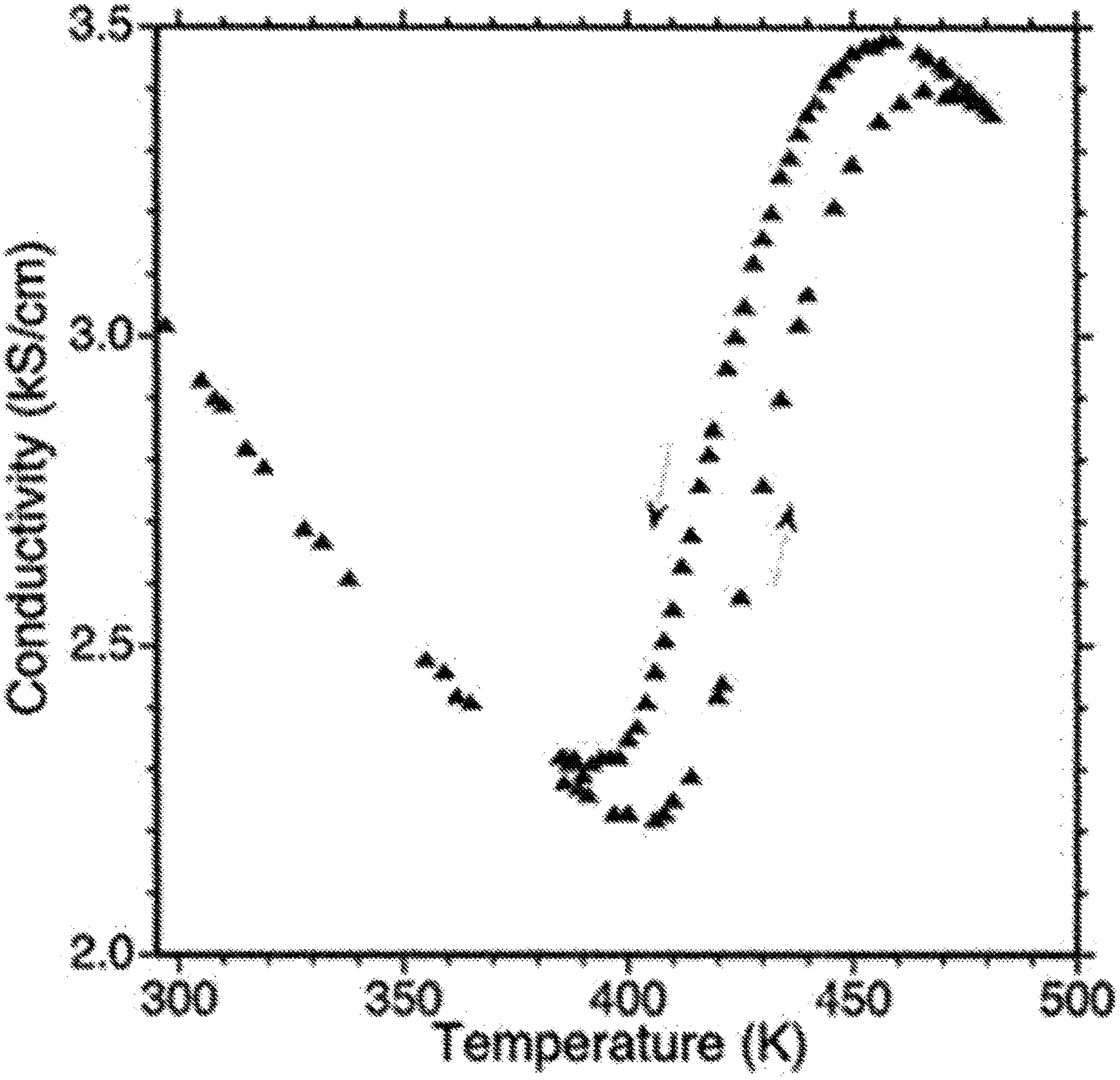
FIG. 11 shows four-probe temperature dependent conductivity of an FeRh film grown on MgO.

FIG. 11 shows the temperature dependent conductivity of an as-grown FeRh film grown on MgO based on 4-probe measurements. Below the transition temperature a monotonic decrease in conductance with increasing temperature, typical of metals is observed. At ~405 K the conductivity abruptly increases before once again displaying metallic behavior above 460 K. During cooling, a similar behavior is observed but with a hysteresis of approximately 15 K. Beginning with a room temperature conductivity of 3 kS $cm^{-1}$, the conductivity decreases to a minimum of 2.2 kS $cm^{-1}$ and then goes up to a maximum of 3.5 kS $cm^{-1}$, i.e., the conductivity ranges from −27% to +17% compared to the room temperature conductivity.

Figure 12:
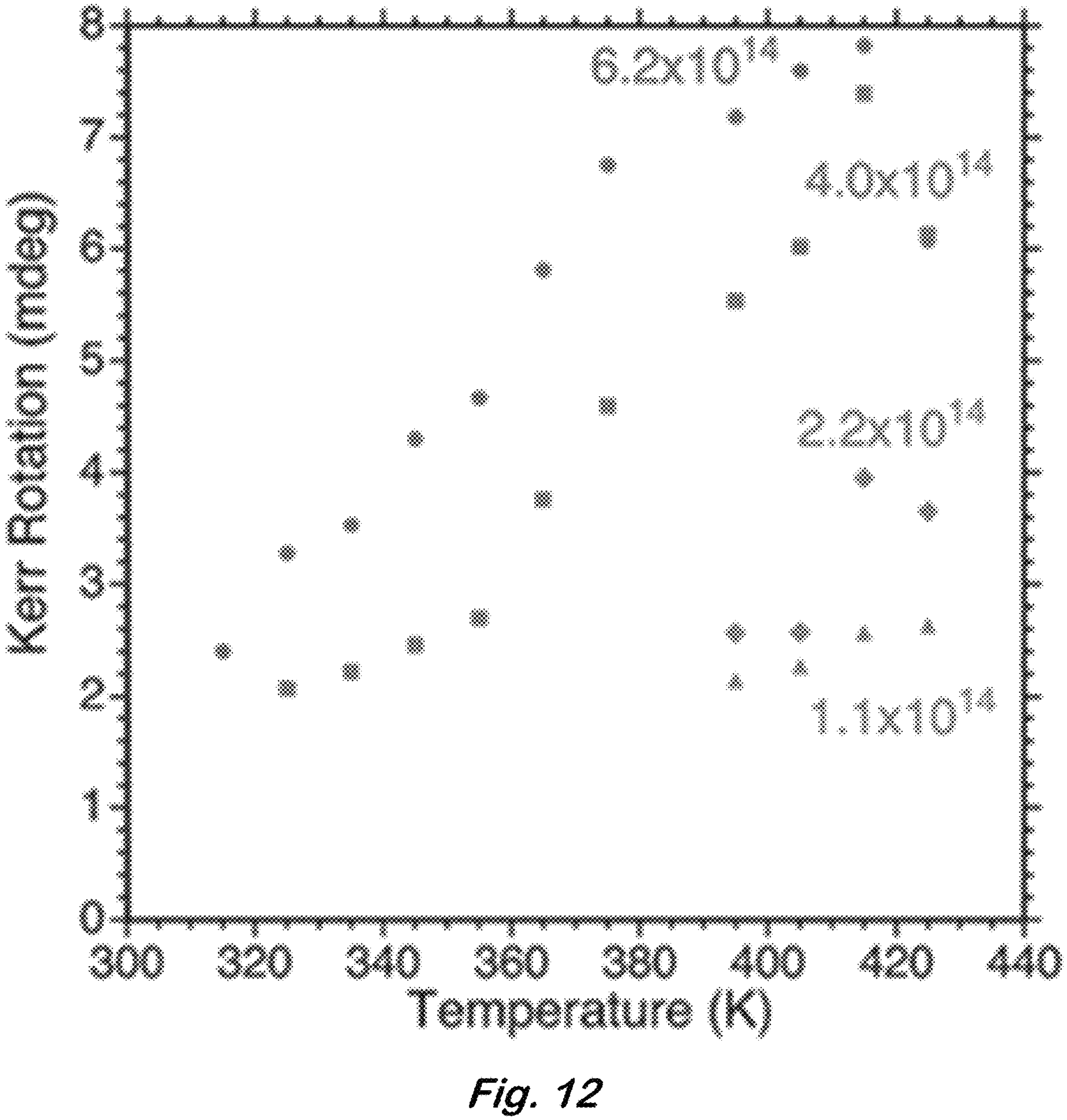
FIG. 12 shows temperature dependent Kerr Rotation measured in films with $He^+$ implantation doses ranging from $1.1\times10^{14}$ to $6.2\times10^{14}$ $He^+$ $cm^{-2}$, as labeled, and the temperatures ranging from 300 K to 425 K as labeled.

FIG. 12 shows the influence of $He^+$ dose on the metamagnetic transition temperature by comparing the temperature-dependent Kerr rotation for four different $He^+$ doses measured simultaneously (for a given temperature) ranging from $1.1\times10^{14}$ to $6.2\times10^{14}$ $He^+$ $cm^{-2}$, all of which are below the saturating dose. At the two lowest doses, a measurable Kerr rotation is observed at 390 K, a point that is about 15 K below the on-set of the as-grown film transition temperature based on conductance. Above 390 K, the Kerr rotation increases gradually for both regions, slightly more for the region implanted with the higher dose of $2.2\times10^{14}$ $He^+$ $cm^{-2}$. The FeRh regions implanted with doses of $4.0\times10^{14}$ $He^+$ $cm^{-2}$ and $6.2\times10^{14}$ $He^+$ $cm^{-2}$ show significantly more temperature dependence, and the onset of observed Kerr rotation decreases in temperature by approximately 75 K and 100 K from that of the $1.1\times10^{14}$ $He^+$ $cm^{-2}$ dose, respectively. This amounts to a decrease of ~1 K per $5\times10^{12}$ $He^+$ $cm^{-2}$, or using the $He^+$ defect formation rate of 212 def per $He^+$, a decrease of ~1 K per $5.3\times10^{19}$ def $cm^{-3}$. To put this in perspective, the latter value corresponds to a volume per defect $V_D$=18.9 $nm^3$ $def^{-1}$ for a mean inter-defect distance of $$L_D = \sqrt[3]{V_D} \cong 2.7 \text{ nm}.$$

This quantifies the sensitivity of the metamagnetic transition in FeRh to defects, and sheds light on a potential source of variability shown in samples being produced in the community at large.

Figure 13:
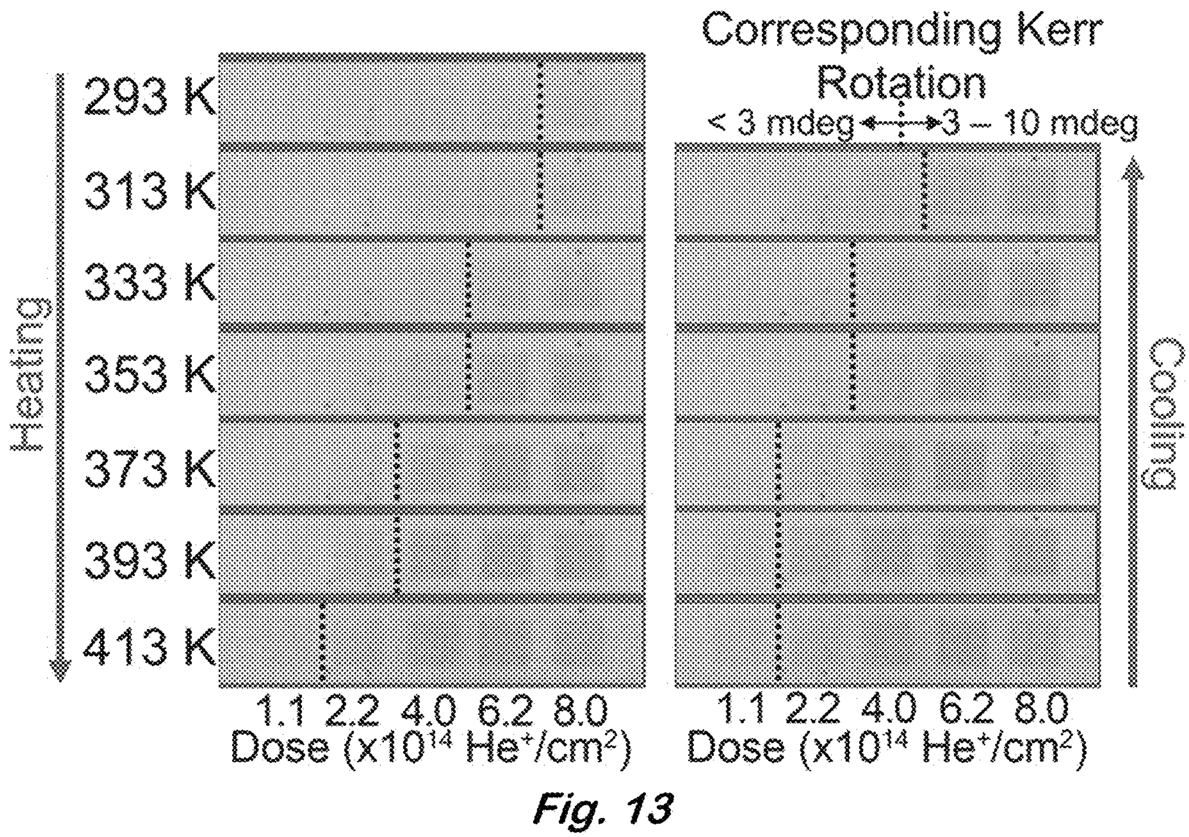
FIG. 13 shows temperature-dependent optical microscopy images for the heating and cooling cycle of an FeRh film processed with five different $He^+$ doses as labeled. Squares=20 μm.
Figure 14:
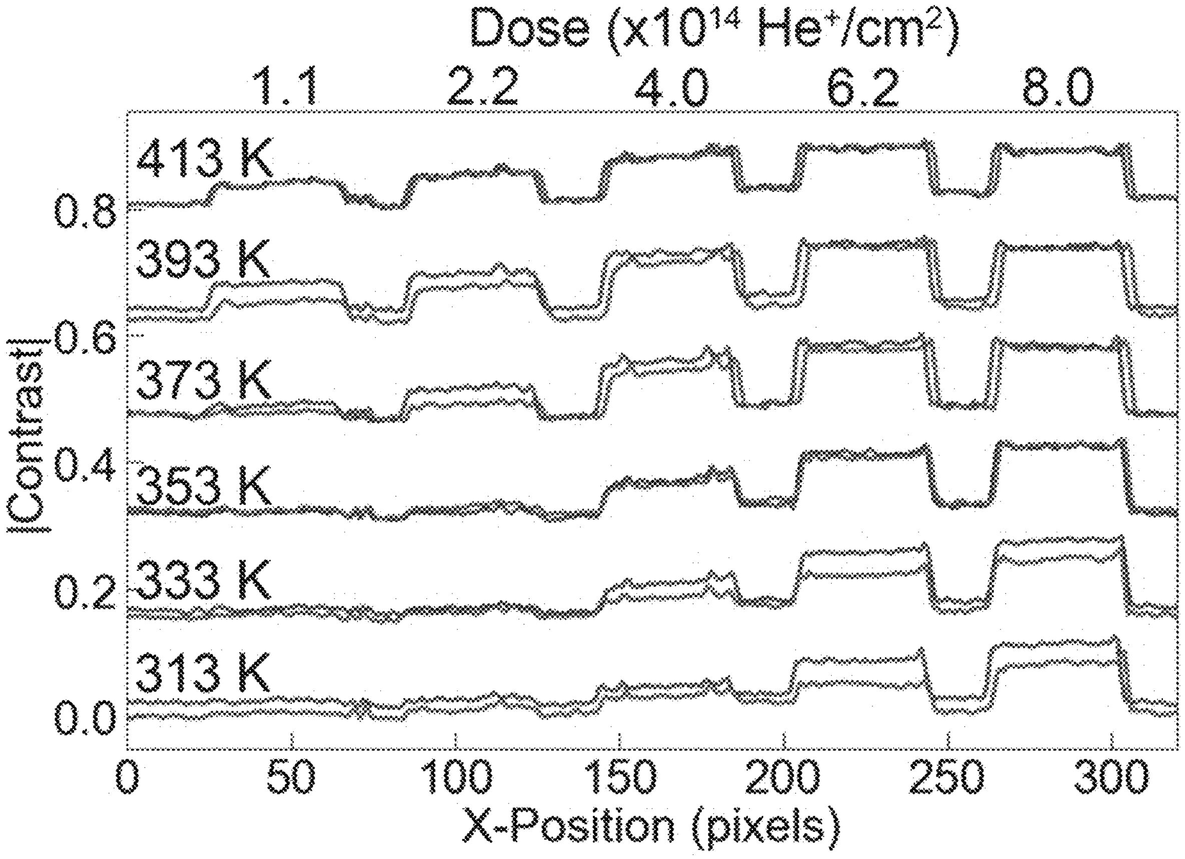
FIG. 14 shows optical contrast versus x-position extracted from the images in FIG. 13 measured during sample heating (lower traces) and cooling (upper traces).

MOKE imaging has been used to observe the changes in FeRh with dose (as shown in FIG. 9), as well as other features such as spatial confinement effects in <500 nm features.[55] Indeed, this technique is used to observe dose and temperature dependent features in FeRh films where features appear with increasing temperature (FIG. 11) or diminish with decreasing temperature (i.e., regions with threshold temperature <295 K). The direct relation between the MOKE contrast and the degree of magnetization in the film makes it an extremely powerful technique. Here the use of optical microscopy to observe the metamagnetic transition is demonstrated by exploiting the fact that the dielectric function, and therefore the optical reflectance, of FeRh varies spectrally between the AF and FM states,[56] enabling easy identification of its magnetic state with an optical microscope. FIG. 13 shows optical microscopy images of the surface of a processed FeRh film during the heating (left) and cooling (right) cycles. The corresponding image contrast, obtained by averaging the same sampling area within each image, for the heating series (red) and cooling series (blue) are shown in FIG. 14. At 293 K, the $8.0\times10^{14}$ $He^+$ $cm^{-2}$ dose is immediately apparent as a region of higher contrast than the film or any of the other processed squares. As the temperature increases, the contrast of this region increases further and upon reaching 333 K, the region processed at $6.2\times10^{14}$ $He^+$ $cm^{-2}$ becomes much more apparent. This trend continues with additional heating, with the dashed line indicating approximately the point when the Kerr rotation exceeds 3 mdeg. During cooling, the opposite behavior is observed with feature contrast diminishing as the temperature decreases, but also with a ~20 K hysteresis in temperature in comparison to the appearance of the feature during heating. This hysteresis is most evident in FIG. 13 where the cooling and heating traces do not overlap for the heating and cooling cycles. Most notably, for the lowest two doses a significant hysteresis is observed at 393 K and 373 K (near the as-grown FeRh transition), while for the highest two doses the hysteresis is greatest at the reduced temperatures of 333 K and 313 K. This behavior is associated with that of a thermal memory that can be monitored remotely and could be useful for thermal process monitoring of systems with delicate thermal budgets.

To explore the limits on the minimum feature size that can be patterned with the HIM, a series of micron and submicron features patterned with a range of doses consisting of a dose series, arrays of nanoscale squares, and a fixed-location spot array were generated. To characterize these samples, conductive atomic force microscopy (CAFM) was used to measure local changes in conductance. CAFM consists of AFM in contact mode with an electrical bias applied between the conducting AFM tip and sample. As the surface topography of the sample is measured based on tip deflection, the tip current is measured simultaneously, generating a spatial current map that is proportional to tip-sample conductance. It can be inferred that the conductivity of the FeRh film at a given temperature will change as a function of $He^+$ dose based on FIG. 11 and the fact that the AF-FM transition temperature (i.e. the dip in FIG. 11) decreases with $He^+$ dose. Additionally, $He^+$ irradiation may modify the FeRh surface conductance caused by desorption (e.g., oxygen) or deposition (e.g., carbon) of surface impurities, or via sputtering surface of the FeRh film. Stemming from either of these mechanisms, the CAFM signal can be used as a means to resolve the $He^+$ dosed regions and the spatial extent of the $He^+$ modification.

Figure 15A:
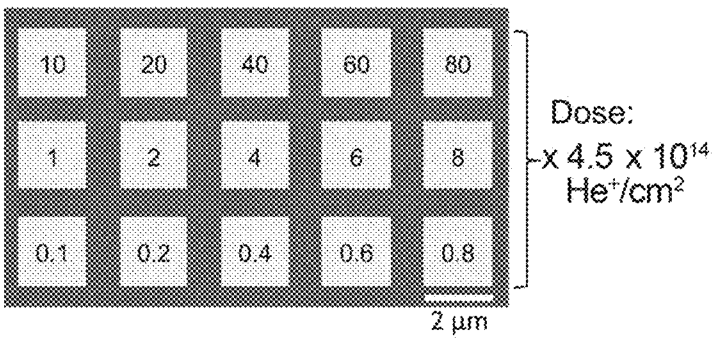
FIGS. 15A-F show Conductive AFM (CAFM) of an FeRh film after He ion exposure.
Figure 15B:
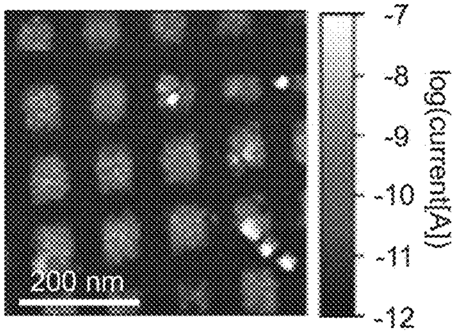
Figure 15C:
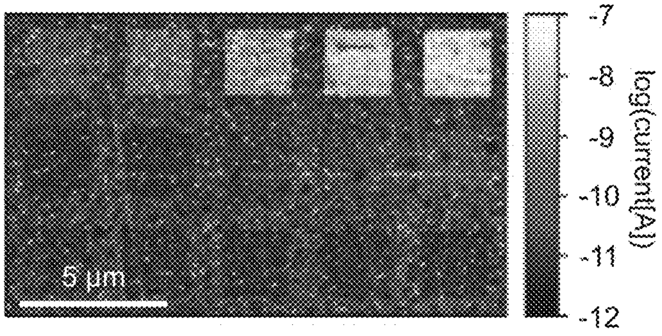

The CAFM results are shown in FIGS. 15A-F, beginning with the dose pattern in FIG. 15A, CAFM current map in FIG. 15B, and the corresponding AFM height map in FIG. 15C. The magnitude of the CAFM current shows a clear dose dependence. Compared to the background current (i.e., outside of patterned squares), the measured current decreases slightly with increasing $He^+$ dose up to ~$4.5\times10^{14}$ $He^+$ $cm^{-2}$. This decrease in current is consistent with the bulk conductivity measurement in FIG. 11, which indicates that the FeRh conductivity decreases before the material transitions from the AF state to the FM state. The decrease in conductivity in the current context could stem from static defect scattering rather than dynamic temperature-induced phonon scattering.[50] Above $9\times10^{14}$ $He^+$ $cm^{-2}$, the measured current increases monotonically with increased $He^+$ dose. This increase in current is consistent with the increase in current observed in FIG. 11 as the material transitions from AF to FM. In general, the qualitative behavior of CAFM current as a function of $He^+$ dose is consistent with FIG. 11 and the fact that the AF-FM transition temperature decreases for increasing $He^+$ However, the >100× increase in current for doses increasing from $3.6\times10^{15}$ $He^+$ $cm^{-2}$ to $3.6\times10^{16}$ $He^+$ $cm^{-2}$ exceeds the small changes in conductivity observed in FIG. 11. This observation suggests that an additional phenomenon, in addition to the AF-FM transition, occurs for such high $He^+$ doses. One hypothesis to explain the exponential increase in current for large doses is that Fe near the surface is selectively sputtered, leaving behind a highly conductive Rh rich alloy with electrical conductivity approaching that of pure Rh. This is supported by TRIM simulations in which 30 keV $He^+$ irradiation of FeRh sputters Fe at a 28% greater rate than Rh. At a dose of $10^{16}$ $He^+$ $cm^{-2}$ the surface would contain about $1.1\times10^{14}$ more Rh at the surface. In comparison to the CAFM current map, the height map in FIG. 15C reveals minimal changes for the lowest 5 doses in the bottom row, a slight increase in height for the second row and the first three features of the top row, and a slight reduction in height for the two highest $He^+$ doses. This lack of correlation between height and dose helps to rule out incremental carbon deposition as the source of spatially varying CAFM current. Based on these results, it is believed that CAFM is a useful tool for verifying the size and shape of nanoscale $He^+$ direct-write patterns in FeRh films, and may also have some sensitivity towards identifying regions with a reduced metamagnetic transition temperature, particularly for $He^+$ doses $<3.6\times10^{15}$ $He^+$ $cm^{-2}$.

Figure 15D:
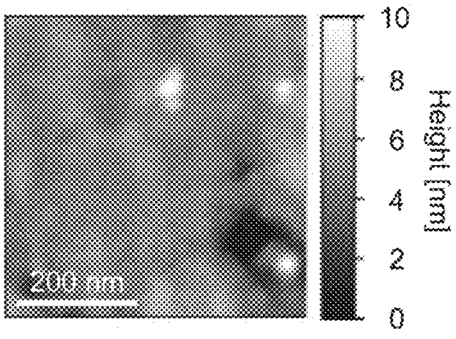
Figure 15E:
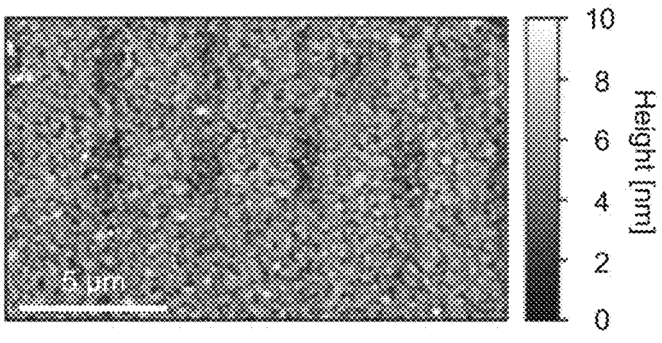
Figure 15F:
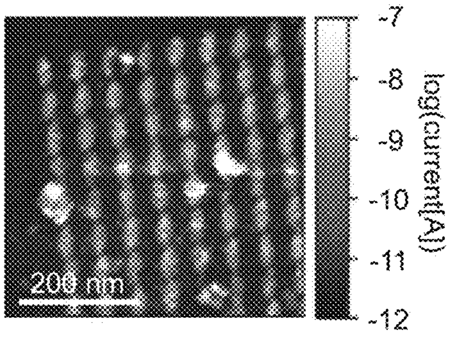

CAFM current and height images shown in FIGS. 15D-E illustrate the direct write capability of patterning well resolved features down to 50 nm with a 100 nm pitch. The dose imparted in these features corresponds to the highest dose from the height map in FIG. 15A of $3.6\times10^{16}$ $He^+$ $cm^{-2}$, and the slight depressions observed in the height map of FIG. 15E correlate well with this dose. The spot array features of FIG. 15F approach the dose-related resolution-limit of the HIM, where a total of $2\times10^5$ $He^+$ were implanted at each fixed-point within the array. This exposure corresponds to the same total number of ions implanted in a 25 nm×25 nm square at a dose level of $3.6\times10^{16}$ $He^+$ $cm^{-2}$. A spot array with a lower dose would likely achieve smaller feature sizes. Like the other patterns, it shows an enhanced CAFM current and features with lateral extent of 25 nm or less for some spots. This dose, however, is exceedingly large and leads to additional pitting of the FeRh film. Notwithstanding, the contrast in the CAFM is apparent, and the ability to pattern 25 nm regions or less, supports the potential of patterning features to dimensions at or below the superparamagnetic limit by means of exchange coupling of the FM region to the AF matrix surrounding the feature.

Collectively, the MOKE, CAFM, and optical microscopy measurements on the irradiated FeRh sample all indicate that the FM phase is present at temperatures well below the transition temperature of the pristine material. To understand the fundamental origins of why defects in FeRh can lower the transition temperature, first-principles calculations are used. The lattice parameter and magnetic moment on Fe and Rh in the FM and the AF phase of the FeRh cubic unit cell obtained from first-principles calculations are summarized in Table 1.

TABLE 1

Lattice parameter, a, and magnitude of the magnetic moment on the Fe, $m_{Fe}$, and Rh, $m_{Rh}$, atoms in the cubic FeRh structure with FM and AF order imposed obtained from first-principles calculations. Experimental data reported in Ref. [57, 58] have been included for comparison.

| | α (Å) | $m_{Fe}$ (μB) | $m_{Rh}$ (μB) |
|---|---|---|---|
| FM | 3.017 | 3.34 | 1.01 |
| FM(Experiment) [57, 58] | 2.996 | 3.14 | 1.00 |
| AF | 3.003 | 3.32 | 0 |
| AF(Experiment) [57, 58] | 2.987 | 3.30 | 0 |

In experiment, transitioning from the AF phase to the FM phase leads to a volume expansion of ~1%,[57] consistent with the first-principles calculations. This is accompanied by a change in the magnetic moment of the Rh atom and the direction of the Fe moments. In the AF phase, the magnetic moments on Fe are antiferromagnetically aligned along the axes of the cubic cell and are ferromagnetically aligned within the [111] plane, while Rh has no magnetic moment by symmetry. In the FM phase the moments on Fe are aligned parallel to each other and Rh gains a magnetic moment of ~1 μB.

As in any first order phase transition, the temperature $T_m$ at which FeRh transitions between the AF and FM phase is determined by the tradeoff between the energy and entropy differences of the two phases. The free energies of the two phases are equal at the transition temperature, so $$\Delta G=\Delta E(T_m)+P\Delta V(T_m)-T_m\Delta S(T_m)=0$$

where ΔE is the energy difference, P is the pressure, ΔV is the volume difference, and ΔS is the entropy difference. The enthalpy contribution of the volume difference is negligible for a process involving rigid solids taking place at ambient pressure. The energy difference is due to both the structural energy associated with the change in volume and to changes in the direction and the magnitude of the magnetic moment on Fe and Rh. If one assumes that the entropy difference is approximately independent of the presence of defects, then the energy difference and its variation with defects is, to a good approximation, proportional to the transition temperature and therefore its corresponding variation.[29,59,60]

From the first-principles calculations the difference in total energy between the AF and the FM FeRh structure, called the spin-flip energy, is $\Delta E = E_{tot}(AF) - E_{tot}(FM)$, where $E_{tot}(AF)$ is the total energy of the FeRh structure with AF magnetic ordering and $E_{tot}(FM)$ is the total energy of the FeRh structure with FM magnetic ordering. Allowing for a full relaxation of the atomic coordinates, volume, and cell shape for each magnetic configuration, it is found that $\Delta E = -24.9$ meV/atom. The FM state is higher in energy, hence unstable at zero temperature, but becomes stable at finite temperature $T_m$ due to entropic effects. External perturbations such as strain, pressure and defects would shift the energy balance between these two states, which would be reflected by a change in ΔE, and in turn the transition temperature. Hence, an analysis of the direction and magnitude of the shift in the transition temperature needs to consider changes in the volume and magnetic order on the Fe and Rh atoms.

Figure 16:
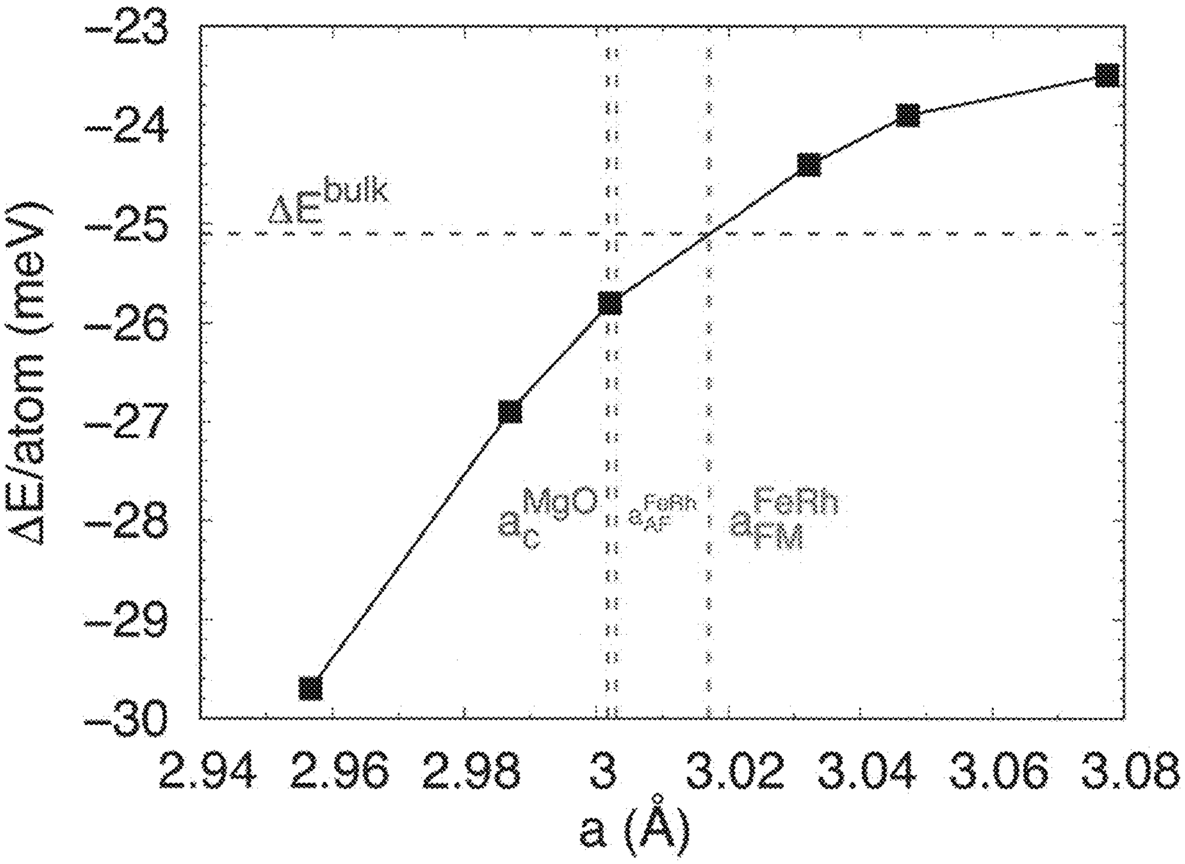
FIG. 16 shows spin-flip energy [$\Delta E = E_{tot}(AF) - E_{tot}(FM)$] per atom between the AF and FM phase of FeRh as a function of equibiaxial in plane strain. The horizontal axis corresponds to the in-plane lattice parameters (a=b) that FeRh is fixed to in the calculations. The dashed vertical lines correspond to the equilibrium lattice parameter of MgO (converted to cubic), cubic FM FeRh and cubic AF FeRh obtained from first-principles calculations. The horizontal dashed line, $\Delta E^{bulk}$, denotes the equilibrium spin-flip energy using the fully relaxed AF and FM lattice parameters of the cubic FeRh cell.

If their lattice constants were epitaxially matched to that of MgO, the FM and AF configurations of FeRh would be under compressive in-plane biaxial strain, although it is likely that the strain in the 200 nm thick film relaxes far from the interface. The MgO lattice parameter from the first-principles calculations is 4.245 Å, which is close to the experimental MgO lattice parameter of 4.212 Å.[61] To determine the impact this maximum epitaxial strain would have on the spin-flip energy, one calculates ΔE imposing biaxial strain on the in-plane FeRh lattice parameters following the approach detailed above. The results are illustrated in FIG. 16. The AF configuration remains lower in energy compared to the FM configuration for all values of the in-plane lattice parameter that considered, i.e., ΔE remains negative. An increase in the magnitude of ΔE corresponds to an increase in the energy to transition from the AF to the FM state. It is evident that when the in-plane lattice parameters of FeRh are strained to the MgO lattice, the magnitude of ΔE increases by 4% with respect to $\Delta E^{bulk}$, which would correspond to an increase in the transition temperature with respect to the bulk transition temperature.

The main effect of the $He^+$ irradiation is the displacement of atoms, leading to localized disorder, forming over 200 vacancies per ion before coming to rest deep within the FeRh film, or in some cases passing entirely through the FeRh layer and coming to rest in the MgO substrate.[53] These displaced atoms will initially leave behind vacancies and move into interstitial positions, but preserve the stoichiometry. They may remain in this form as Frenkel pairs, heal completely by the annihilation of an interstitial with a vacancy of the same species, or create antisites by the recombination of an interstitial of one species with a vacancy of the other species. Prior first-principles calculations have suggested that defects may lower the transition temperature, assuming the transition temperature is proportional to the energy difference between the FM and AFM state. This was based on calculations of a single Fe and Rh antisite pair in a 16 atom FeRh cell (i.e., a concentration of 12.5% per formula unit), where they found the ground state to be FM.[62] Here three types of point-defect pairs that preserve stoichiometry are simulated: Rh and Fe Frenkel pairs, and an antisite pair. Large 432 atom supercells are used, which enables simulating defect concentrations (i.e., $1.17\times10^{20}$ $cm^{-3}$) that are well below the defect concentration (i.e., $1.6\times10^{22}$ $cm^{-3}$) that results in a saturated room temperature Kerr rotation following $He^+$ irradiation.

Figure 17:
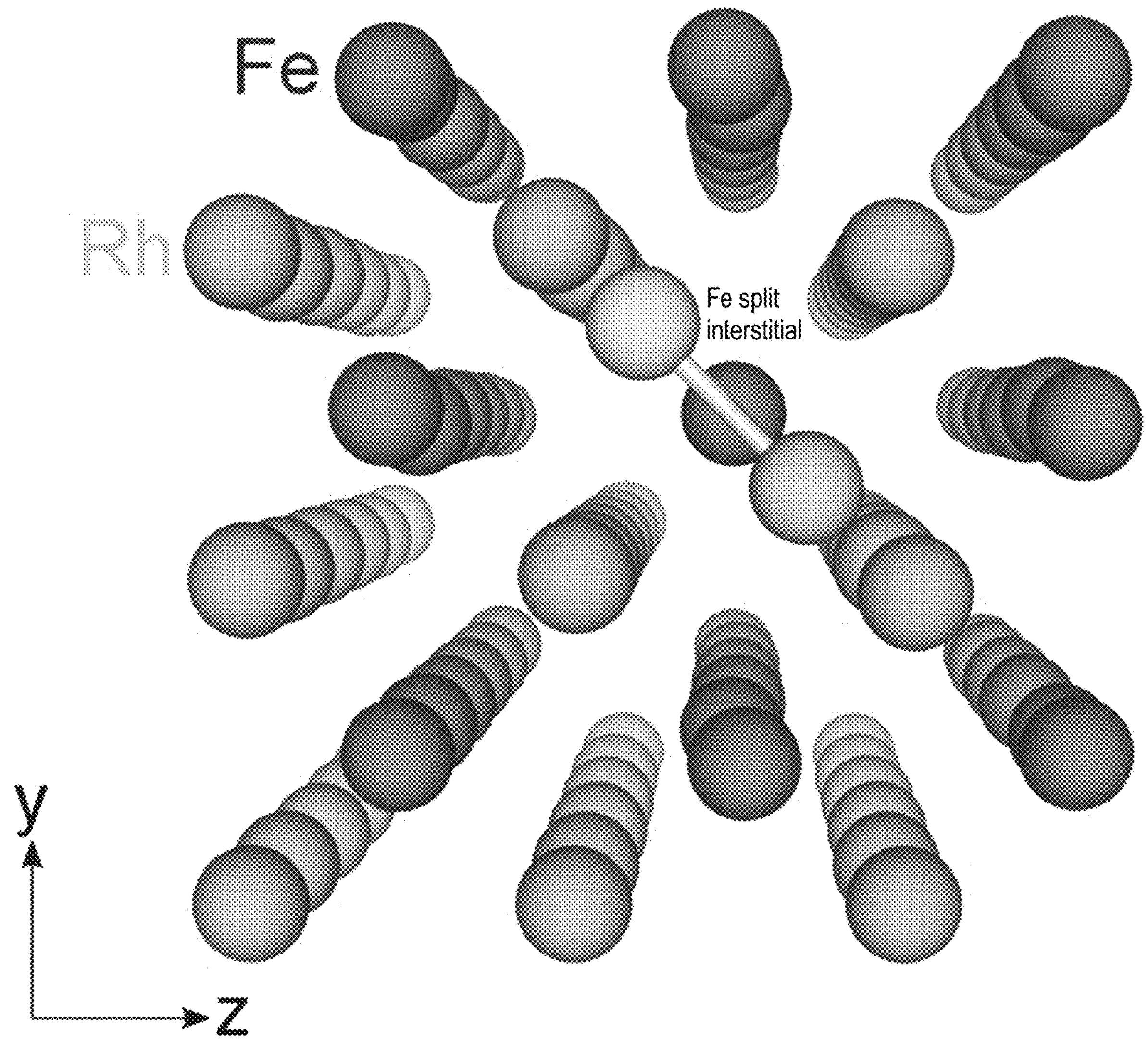
FIG. 17 shows the structure of the Fe split interstitial of the Fe Frenkel defect.

The local structure around the defect controls its energy and magnetic structure, and therefore its effect on the transition temperature. While the vacancies and antisites induce only minor atomic relaxation, the interstitials lead to more drastic deformation of the lattice. To visualize one such defect, FIG. 17 illustrates the atomic structure of the displaced Fe interstitial of the Fe Frenkel defect (Fe vacancy—interstitial pair). The Fe interstitial takes on a split-interstitial configuration, two Fe atoms sharing one Fe lattice site, with an Fe—Fe bond length of 2.03 Å. The Rh atoms that are nearest-neighbor to the Fe split-interstitial are displaced slightly outwards from their equilibrium positions. For the case of the Rh Frenkel pair (not shown), the displaced Rh interstitial does not form a split interstitial with a Rh atom within the lattice. Instead, it bonds to one of the Fe atoms, with a Fe—Rh bond length of 2.14 Å, resulting in the Fe atom being displaced away from its equilibrium position along the <110>direction. The Fe and Rh vacancies and antisites lead to minor changes in their nearest-neighbor bond lengths. For the case of Fe on the Rh antisite, the nearest neighbor Fe—Rh bond is 0.6% shorter than the equilibrium bond length while the Rh on the Fe antisite results in nearest-neighbor Rh—Fe bonds that are 3.3% shorter than the equilibrium bond length. The formation energies and percent change in spin flip energies are listed in Table 2.

TABLE 2

Point-defect pair properties, including relaxed formation energies in the AF order, and change in spin-flip energy relative to perfect material at concentration of one pair per 432 atoms ($1.7\times10^{20}$ $cm^{-3}$)

| Defect | Description | Formation Energy (eV) | Spin-flip energy change |
|---|---|---|---|
| $V_{Fe}$ - $Fe_I$ | Fe vacancy - interstitial pair | 6.1 | −3.3% |
| $V_{RhO}$ - $Rh_I$ | Rh vacancy - interstitial pair | 7.1 | −2.74% |
| $Fe_{Rh}$ - $Rh_{Fe}$ | Fe and Rh anti site defect pair | 1.6 | −5.5% |

It was found that the formation energies of the two types of Frenkel pairs in the AF order are quite large, about 6-7 eV, while the formation energy of an antisite pair is much lower, about 1.6 eV. If the system were in equilibrium these energies would indicate that antisite defects would be much more abundant. Since the $He^+$ irradiation process is strongly out of equilibrium, this is not necessarily the case, but it does indicate that the driving force to healing vacancies and interstitials, whether back to the perfect lattice or to antisites, is strong. It was also found that all types of defect pairs studied lower the magnitude of the spin flip energy by a few percent at the calculated concentration of two point-defects (one pair) per 432 atoms in the supercell (216 FeRh formula units per supercell). Within the approximation that the transition temperature is proportional to the spin flip energy, these results are consistent with the point defects reducing the transition temperature as seen experimentally.

In summary, a direct-write process has been established for tailoring the FeRh metamagnetic transition temperature using focused $He^+$ ion irradiation with spatial control down to 25 nm and approaching the superparamagnetic limit. Physical characterization of the material using HR-TEM and XRD confirm the crystalline quality and epitaxial registry with the MgO growth substrate. The temperature dependent MOKE images show a strong correlation between Kerr rotation and $He^+$ dose, directly confirming the tunability of the magnetic ordering from AF to FM with increasing temperature and lowering of the metamagnetic transition temperature with dose.

In this work, two novel characterization methods are introduced for indirectly quantifying the impact of $He^+$ irradiation on the metamagnetic transition of FeRh films. Foremost, temperature dependent optical microscopy, with concomitant optical contrast image processing, is used to rapidly quantify the AF to FM transition for regions with varying dose. This technique correlates strongly with the temperature dependent MOKE results, and reveals hysteresis in the contrast for increasing and decreasing temperature sweeps—direct evidence of the metamagnetic transition. CAFM was developed as a means to characterize nanoscale features patterned in FeRh down to ~25 nm. A dose-gradient array of squares reveal a direct correlation of CAFM current magnitude with dose, while the topography shows a non-monotonic trend providing evidence for the relationship between the CAFM current magnitude and the magnetic ordering of the FeRh film.

First principles-based calculations were performed to quantify the impact that substrate strain and point defects (Frenkel and antisite pairs) have on the spin-flip energy of the system, which is directly related to the metamagnetic transition temperature. For FeRh grown on MgO, the calculations determine an increased magnitude of the spin-flip energy due to the epitaxial lattice-constant match, suggesting an increased metamagnetic transition temperature. In contrast, the simple defects studied here all lead to a slight reduction in the magnitude of the spin-flip energy. Therefore, no single defect type is responsible for modifying the metamagnetic transition, but rather, any defect that degrades the AF ordering can play a role in decreasing the transition temperature.

Ultimately, this demonstrates the ability to spatially pattern nanoscale magnetic ordering, as a gateway into realizing multiple domains of distinct magnetic ordering, (antiferromagnetic, ferromagnetic, paramagnetic) on the same film. The results thereby enable the creation of magnetic metamaterials and previously unattainable interface-free antiferromagnetic spintronic devices that are dynamically temperature tunable.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

REFERENCES

[1] T. Okuno, D. H. Kim, S. H. Oh, S. K. Kim, Y. Hirata, T. Nishimura, W. S. Ham, Y. Futakawa, H. Yoshikawa, A. Tsukamoto, Y. Tserkovnyak, Y. Shiota, T. Moriyama, K. J. Kim, K. J. Lee, T. Ono, *Nat. Electron.* 2019, DOI 10.1038/s41928-019-0303-5.

[2] Z. Liu, Z. Feng, H. Yan, X. Wang, X. Zhou, P. Qin, H. Guo, R. Yu, C. Jiang, *Adv. Electron. Mater.* 2019, DOI 10.1002/aelm.201900176.

[3] T. Jungwirth, J. Sinova, A. Manchon, X. Marti, J. Wunderlich, C. Felser, *Nat. Phys.* 2018, DOI 10.1038/s41567-018-0063-6.

[4] P. Němec, M. Fiebig, T. Kampfrath, A. V. Kimel, *Nat. Phys.* 2018, DOI 10.1038/s41567-018-0051-x.

[5] Z. Q. Liu, L. Li, Z. Gai, J. D. Clarkson, S. L. Hsu, A. T. Wong, L. S. Fan, M.-W. Lin, C. M. Rouleau, T. Z. Ward, H. N. Lee, A. S. Sefat, H. M. Christen, R. Ramesh, *Phys. Rev. Lett.* 2016, 116, 097203.

[6] J. T. Heron, J. L. Bosse, Q. He, Y. Gao, M. Trassin, L. Ye, J. D. Clarkson, C. Wang, J. Liu, S. Salahuddin, D. C. Ralph, D. G. Schlom, J. Íñiguez, B. D. Huey, R. Ramesh, *Nature* 2014, 516, 370.

[7] G. L. Causer, D. L. Cortie, H. Zhu, M. Ionescu, G. J. Mankey, X. L. Wang, F. Klose, *ACS Appl. Mater. Interfaces* 2018, 10, 16216.

[8] S. P. Bennett, A. Herklotz, C. D. Cress, A. Ievlev, C. M. Rouleau, I. I. Mazin, V. Lauter, *Mater. Res. Lett.* 2018, DOI 10.1080/21663831.2017.1402098.

[9] J. M. Lommel, J. S. Kouvel, *J. Appl. Phys.* 1967, 38, 1263.

[10] I. S. Jacobs, P. E. Lawrence, *Phys. Rev.* 1967, DOI 10.1103/PhysRev.164.866.

[11] J. Lyubina, O. Gutfleisch, M. D. Kuz'min, M. Richter, *J. Magn. Magn. Mater.* 2008, DOI 10.1016/j.jmmm.2008.04.116.

[12] G. Aeppli, E. Bucher, C. Broholm, J. K. Kjems, J. Baumann, J. Hufnagl, *Phys. Rev. Lett.* 1988, DOI 10.1103/PhysRevLett.60.615.

[13] S. Y. Zhang, P. Zhao, R. W. Li, H. W. Zhang, B. G. Shen, *J. Appl. Phys.* 2002, DOI 10.1063/1.1461886.

[14] J. S. Kouvel, *J. Appl. Phys.* 1966, 37, 1257.

[15] J. S. Kouvel, C. C. Hartelius, *J. Appl. Phys.* 1962, 33, 1343.

[16] Z. Feng, H. Yan, Z. Liu, *Adv. Electron. Mater.* 2019, DOI 10.1002/aelm.201800466.

[17] C. Vogler, C. Abert, F. Bruckner, D. Suess, *Phys. Rev. Appl.* 2017, DOI 10.1103/PhysRevApplied.8.054021.

[18] V. Uhlíř, J. A. Arregi, E. E. Fullerton, *Nat. Commun.* 2016, 7, 13113.

[19] I. Gray, G. M. Stiehl, J. T. Heron, A. B. Mei, D. G. Schlom, R. Ramesh, D. C. Ralph, G. D. Fuchs, *Phys. Rev. Mater.* 2019, 3, 124407.

[20] Y. Liu, L. C. Phillips, R. Mattana, M. Bibes, A. Barthélémy, B. Dkhil, *Nat. Commun.* 2016, 7, 11614.

[21] R. O. Cherifi, V. Ivanovskaya, L. C. Phillips, a Zobelli, I. C. Infante, E. Jacquet, V. Garcia, S. Fusil, P. R. Briddon, N. Guiblin, a Mougin, a a Ünal, F. Kronast, S. Valencia, B. Dkhil, a Barthélémy, M. Bibes, *Nat. Mater.* 2014, 13, DOI 10.1038/nmat3870.

[22] S. P. Bennett, A. T. Wong, A. Glavic, A. Herklotz, C. Urban, I. Valmianski, M. D. Biegalski, H. M. Christen, T. Z. Ward, V. Lauter, *Sci. Rep.* 2016, 6, 22708.

[23] J. L. Warren, C. W. Barton, C. Bull, T. Thomson, *Sci. Rep.* 2020, 10, 1.

[24] R. Witte, R. Kruk, D. Wang, S. Schlabach, R. A. Brand, M. E. Gruner, H. Wende, H. Hahn, *Phys. Rev. B* 2019, DOI 10.1103/PhysRevB.99.134109.

[25] C. Urban, S. P. Bennett, I. K. Schuller, *Sci. Rep.* 2020, 10, 6312.

[26] F. Pressacco, V. Uhlíř, M. Gatti, A. Nicolaou, A. Bendounan, J. A. Arregi, S. K. K. Patel, E. E. Fullerton, D. Krizmancic, F. Sirotti, *Struct. Dyn.* 2018, 5, 1.

[27] B. R. McGrath, R. E. Camley, K. L. Livesey, *Phys. Rev. B* 2020, 101, 014444.
[28] U. Aschauer, R. Braddell, S. A. Brechbühl, P. M. Derlet, N. A. Spaldin, *Phys. Rev. B* 2016, 94, 1.
[29] M. Wolloch, M. E. Gruner, W. Keune, P. Mohn, J. Redinger, F. Hofer, D. Suess, R. Podloucky, J. Landers, S. Salamon, F. Scheibel, D. Spoddig, R. Witte, B. Roldan Cuenya, O. Gutfleisch, M. Y. Hu, J. Zhao, T. Toellner, E. E. Alp, M. Siewert, P. Entel, R. Pentcheva, H. Wende, *Phys. Rev. B* 2016, 94, 1.
[30] J. Kudrnovsk??, V. Drchal, I. Turek, *Phys. Rev. B—Condens. Matter Mater. Phys.* 2015, 91, 1.
[31] L. H. Lewis, C. H. Marrows, S. Langridge, *J. Phys. D. Appl. Phys.* 2016, 49, DOI 10.1088/0022-3727/49/32/323002.
[32] N. V. Baranov, E. A. Barabanova, *J. Alloys Compd.* 1995, 219, 139.
[33] R. Barua, F. Jiménez-Villacorta, L. H. Lewis, *Appl. Phys. Lett.* 2013, 103, DOI 10.1063/1.4820583.
[34] R. Soma, Y. Saitoh, M. Sakamaki, K. Amemiya, A. Iwase, T. Matsui, *AIP Adv.* 2018, DOI 10.1063/1.5007704.
[35] N. Fujita, T. Matsui, S. Kosugi, T. Satoh, Y. Saitoh, K. Takano, M. Koka, T. Kamiya, S. Seki, A. Iwase, *Jpn. J. Appl. Phys.* 2010, 49, 060211.
[36] R. Bali, S. Wintz, F. Meutzner, R. Hübner, R. Boucher, A. A. Ünal, S. Valencia, A. Neudert, K. Potzger, J. Bauch, F. Kronast, S. Facsko, J. Lindner, J. Fassbender, *Nano Lett.* 2014, DOI 10.1021/n1404521c.
[37] A. Mougin, T. Mewes, M. Jung, D. Engel, A. Ehresmann, H. Schmoranzer, J. Fassbender, B. Hillebrands, *Phys. Rev. B—Condens. Matter Mater. Phys.* 2001, 63, 060409.
[38] S. Cervera, M. Trassinelli, M. Marangolo, C. Carrétéro, V. Garcia, S. Hidki, E. Jacquet, E. Lamour, A. Lévy, S. Macé, C. Prigent, J. P. Rozet, S. Steydli, D. Vernhet, *Phys. Rev. Mater.* 2017, 1, 1.
[39] N. Fujita, S. Kosugi, Y. Saitoh, Y. Kaneta, K. Kume, T. Batchuluun, N. Ishikawa, T. Matsui, A. Iwase, *J. Appl. Phys.* 2010, 107, 10.
[40] A. Heidarian, R. Bali, J. Grenzer, R. A. Wilhelm, R. Heller, O. Yildirim, J. Lindner, K. Potzger, *Nucl. Instruments Methods Phys. Res. Sect. B Beam Interact. with Mater. Atoms* 2015, 358, 251.
[41] T. Koide, T. Satoh, M. Kohka, Y. Saitoh, T. Kamiya, T. Ohkouchi, M. Kotsugi, T. Kinoshita, T. Nakamura, A. Iwase, T. Matsui, *Jpn. J. Appl. Phys.* 2014, 53, 05FC06.
[42] F. I. Allen, N. R. Velez, R. C. Thayer, N. H. Patel, M. A. Jones, G. F. Meyers, A. M. Minor, *Nanoscale* 2019, 11, 1403.
[43] F. I. Allen, P. Hosemann, M. Balooch, *Scr. Mater.* 2020, 178, 256.
[44] J. Klein, A. Kuc, A. Nolinder, M. Altzschner, J. Wierzbowski, F. Sigger, F. Kreupl, J. J. Finley, U. Wurstbauer, A. W. Holleitner, M. Kaniber, *2D Mater.* 2017, 5, 011007.
[45] J. Klein, M. Lorke, M. Florian, F. Sigger, L. Sigl, S. Rey, J. Wierzbowski, J. Cerne, K. Müller, E. Mitterreiter, P. Zimmermann, T. Taniguchi, K. Watanabe, U. Wurstbauer, M. Kaniber, M. Knap, R. Schmidt, J. J. Finley, A. W. Holleitner, *Nat. Commun.* 2019, 10, 1.
[46] A. B. Mei, I. Gray, Y. Tang, J. Schubert, D. Werder, J. Bartell, D. C. Ralph, G. D. Fuchs, D. G. Schlom, 2019, 1.
[47] P. F. A. Alkemade, E. M. Koster, E. Van Veldhoven, D. J. Maas, *Scanning* 2012, DOI 10.1002/sca.21009.
[48] M. Holz, F. I. Allen, C. Reuter, A. Ahmad, M. Hofmann, A. Reum, T. Ivanov, I. W. Rangelow, *J. Vac. Sci. Technol. B* 2019, 37, 061812.
[49] C. Pöpsel, J. Becker, N. Jeon, M. Döblinger, T. Stettner, Y. T. Gottschalk, B. Loitsch, S. Matich, M. Altzschner, A. W. Holleitner, J. J. Finley, L. J. Lauhon, G. Koblmüller, *Nano Lett.* 2018, DOI 10.1021/acs.nanolett.8b01282.
[50] B. Eggert, A. Schmeink, J. Lill, M. O. L. A. Wagner, S. Pascarelli, K. Potzger, J. Lindner, T. Thomson, J. Fassbender, K. Ollefs, W. Keune, R. Bali, H. Wende, 2019, 1.
[51] J. Ehrler, B. Sanyal, J. Grenzer, S. Zhou, R. Böttger, B. Eggert, H. Wende, J. Lindner, J. Fassbender, C. Leyens, K. Potzger, R. Bali, 2019, 1.
[52] A. Iwase, M. Fukuzumi, Y. Zushi, M. Suzuki, M. Takagaki, N. Kawamura, Y. Chimi, N. Ishikawa, J. Mizuki, F. Ono, *Nucl. Instruments Methods Phys. Res. Sect. B Beam Interact. with Mater. Atoms* 2007, 256, 429.
[53] J. F. Ziegler, M. D. Ziegler, J. P. Biersack, *Nucl. Instruments Methods Phys. Res. Sect. B Beam Interact. with Mater. Atoms* 2010, DOI 10.1016/j.nimb.2010.02.091.
[54] M. J. Boschini, P. G. Rancoita, M. Tacconi, "SR-NIEL Calculator: Screened Relativistic (SR) Treatment for Calculating the Displacement Damage and Nuclear Stopping Powers for Electrons, Protons, Light- and Heavy-Ions in Materials (version 6.2.4)," 2014.
[55] J. A. Arregi, M. Horký, K. Fabianová, R. Tolley, E. E. Fullerton, V. Uhlíř, *J. Phys. D. Appl. Phys.* 2018, 51, 105001.
[56] S. P. Bennett, M. Currie, O. M. J. van't Erve, I. I. Mazin, *Opt. Mater. Express* 2019, DOI 10.1364/ome.9.002870.
[57] G. Shirane, R. Nathans, C. W. Chen, *Phys. Rev.* 1964, 134, DOI 10.1103/PhysRev.134.A1547.
[58] A. I. Zakharov, A. M. Kadomtseva, R. Z. Levitin, E. G. Ponyatovskii, *J. Exptl. Theor. Phys* 1964, 19.
[59] N. A. Zarkevich, D. D. Johnson, *Phys. Rev. B* 2018, 97, 1.
[60] N. A. Zarkevich, D. D. Johnson, *J. Alloys Compd.* 2019, 802, 712.
[61] D. G. Isaak, O. L. Anderson, T. Goto, *Phys. Chem. Miner.* 1989, 16, 704.
[62] Y. Kaneta, S. Ishino, Y. Chen, S. Iwata, A. Iwase, *Jpn. J. Appl. Phys.* 2011, 50, 4.
[63] P. E. Blöchl, *Phys. Rev. B* 1994, 50, 17953.
[64] G. Kresse, J. Hafner, *Phys. Rev. B* 1993, 47, 558.
[65] J. P. Perdew, K. Burke, M. Ernzerhof, *Phys. Rev. Lett.* 1996, 77, 3865.
[66] V. I. Anisimov, I. V. Solovyev, M. A. Korotin, M. T. Czyyk, G. A. Sawatzky, *Phys. Rev. B* 1993, 48, 16929.
[67] Bennett, S., Ambaye, H., Lee, H. et al. Direct Evidence of Anomalous Interfacial Magnetization in Metamagnetic Pd doped FeRh Thin Films. Sci Rep 5, 9142 (2015)
[68] Haast, M, Patterned magnetic thin films for ulta high density recording, Thesis University of Twente, ISBN 90-36513456.

What is claimed is:

1. An article comprising:
a substrate; and
a layer of an FeRh alloy disposed on the substrate;
wherein the alloy comprises:
a continuous antiferromagnetic phase; and
one or more discrete phases smaller in area than the continuous phase having a lower metamagnetic transition temperature than the continuous phase;
wherein the one or more discrete phase has a superparamagnetic limit that exceeds the superparamagnetic limit of the continuous phase.

2. The article of claim 1, wherein the alloy comprises an array of the discrete phases.

3. The article of claim 1, wherein the discrete phase is ferromagnetic.

4. A method comprising:

providing an article comprising:

a substrate; and a layer of an FeRh alloy disposed on the substrate; wherein the alloy comprises: a continuous antiferromagnetic phase; and one or more discrete phases smaller in area than the continuous phase having a lower metamagnetic transition temperature than the continuous phase; wherein the one or more discrete phase has a superparamagnetic limit that exceeds the superparamagnetic limit of the continuous phase; wherein the discrete phase is ferromagnetic; and orienting the magnetic polarization of a first ferromagnetic discrete phase.

5. The method of claim 4, further comprising:

orienting the magnetic polarization of a second ferromagnetic discrete phase in a direction different from that of the first ferromagnetic discrete phase.

6. A method comprising:

providing an article comprising:

a substrate; and a layer of an FeRh alloy disposed on the substrate; wherein the alloy comprises: a continuous antiferromagnetic phase; and one or more discrete phases smaller in area than the continuous phase having a lower metamagnetic transition temperature than the continuous phase; wherein the one or more discrete phase has a superparamagnetic limit that exceeds the superparamagnetic limit of the continuous phase; wherein the discrete phase is ferromagnetic; and determining the orientation of the magnetic polarization of the ferromagnetic discrete phase.

7. The article of claim 1, wherein the area of the discrete phase is no more than 1000 $\mu m^2$.

8. The article of claim 1, wherein the area of the discrete phase is no more than 1000 $nm^2$.

9. The article of claim 1, wherein the discrete phase has a metamagnetic transition temperature of 20° C. to 140° C.

10. A method comprising:

providing an article comprising:

a substrate; and a layer of an FeRh alloy disposed on the substrate; wherein the alloy comprises: a continuous antiferromagnetic phase; and one or more discrete phases smaller in area than the continuous phase having a lower metamagnetic transition temperature than the continuous phase; wherein the one or more discrete phase has a superparamagnetic limit that exceeds the superparamagnetic limit of the continuous phase; and detecting the presence, absence, or location of any ferromagnetic discrete phases.

11. The method claim 10, further comprising:

adjusting the temperature of the article before the detection.

12. The article of claim 1, wherein at least two of the discrete phases have different metamagnetic temperatures.

13. A method comprising:

providing an article comprising:

a substrate; and a layer of an FeRh alloy disposed on the substrate; wherein the alloy comprises: a continuous antiferromagnetic phase; and one or more discrete phases smaller in area than the continuous phase having a lower metamagnetic transition temperature than the continuous phase; wherein the one or more discrete phase has a superparamagnetic limit that exceeds the superparamagnetic limit of the continuous phase; wherein at least two of the discrete phases have different metamagnetic temperatures; and detecting the presence, absence, or location of any ferromagnetic discrete phases;

adjusting the temperature of the article; and detecting the presence, absence or location of any ferromagnetic discrete phases.

14. The article of claim 1, wherein the discrete phases have a size and pitch that exceed the superparamagnetic limit of the continuous phase.

15. The article of claim 1, wherein the substrate comprises MgO.

16. The article of claim 1, wherein the substrate comprises a piezoelectric material.

17. A method comprising:

providing an article comprising:

a substrate; and a layer of an FeRh alloy disposed on the substrate; wherein the alloy comprises: a continuous antiferromagnetic phase; and one or more discrete phases smaller in area than the continuous phase having a lower metamagnetic transition temperature than the continuous phase; wherein the one or more discrete phase has a superparamagnetic limit that exceeds the superparamagnetic limit of the continuous phase; wherein the substrate comprises a piezoelectric material; and applying a voltage to the piezoelectric material that alters the metamagnetic temperature of one or more of the discrete phases; and detecting the presence, absence, or location of any ferromagnetic discrete phases.

18. A method comprising:

providing an article comprising:

a substrate; and a layer comprising a continuous phase of an antiferromagnetic FeRh alloy disposed on the substrate; and directing an ion source at one or more portions of the alloy to create one or more discrete phases smaller in area than the continuous phase having a lower metamagnetic transition temperature than the continuous phase;

wherein the one or more discrete phases has a superparamagnetic limit that exceeds the superparamagnetic limit of the continuous phase.

19. The method of claim 18, wherein the ion source produces $He^+$ ions.

20. The method of claim 18, wherein a mask is used to define the discrete phases.

21. The method of claim 18, wherein the ion source is a beam.

22. The method of claim 18, wherein the ion source is a $He^+$ beam having a diameter of no more than 5 nm.

23. The method of claim 18, wherein the dose of the ion source is adjusted to create at least two discrete phases having different metamagnetic transition temperatures.

24. A method comprising:

providing an article comprising:

a substrate; and a layer comprising a continuous phase of an antiferromagnetic FeRh alloy disposed on the substrate; and directing an electron source at one or more portions of the alloy to create one or more discrete phases smaller in area than the continuous phase having a lower metamagnetic transition temperature than the continuous phase;

wherein the one or more discrete phases has a superparamagnetic limit that exceeds the superparamagnetic limit of the continuous phase.

25. The method of claim 24, wherein the electron source produces electrons with kinetic energy between 300 keV and 460 keV.

26. The method of claim 24, wherein the electron source produces electrons with kinetic energy above 460 keV.

27. The method of claim 24, wherein a mask is used to define the discrete phases.

28. The method of claim 24, wherein the electron source is a beam.

29. The method of claim 24, wherein the electron source is an electron beam having a diameter of no more than 5 nm.

30. The method of claim 24, wherein the dose of the electron source is adjusted to create at least two discrete phases having different metamagnetic transition temperatures.

31. The method of claim 24, wherein the energy of the electron source is adjusted to preferentially create Fe vacancies.

32. The method of claim 25, wherein the energy of the electron source is adjusted to create both Fe and Rh vacancies.

33. The article of claim 1, wherein the area of the discrete phase is no more than 25 nm×25 nm.

* * * * *